(12) United States Patent
Tan et al.

(10) Patent No.: US 7,999,895 B2
(45) Date of Patent: Aug. 16, 2011

(54) CONTRAST COMPENSATION OF MICRODISPLAY PANELS INCLUDING A HIGH ORDER WAVEPLATE

(75) Inventors: Kim Leong Tan, Singapore (SG); Nada A. O'Brien, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 223 days.

(21) Appl. No.: 12/497,246

(22) Filed: Jul. 2, 2009

(65) Prior Publication Data

US 2010/0026945 A1    Feb. 4, 2010

Related U.S. Application Data

(60) Provisional application No. 61/077,710, filed on Jul. 2, 2008.

(51) Int. Cl.
    *G02F 1/13363*      (2006.01)

(52) U.S. Cl. ........ 349/119; 349/118; 349/120; 349/158; 349/162

(58) Field of Classification Search .................. 349/102, 349/117, 118, 119, 120, 158, 162; 359/497, 359/499, 500; 428/1.3, 1.6, 1.62
See application file for complete search history.

(56) References Cited

U.S. PATENT DOCUMENTS

| | | | | |
|---|---|---|---|---|
| 5,589,963 | A | 12/1996 | Gunning, III et al. | ........ 349/119 |
| 6,577,375 | B1 * | 6/2003 | Umehara et al. | ............... 349/158 |
| 6,954,235 | B1 * | 10/2005 | Russell et al. | .................... 349/38 |
| 7,126,649 | B2 * | 10/2006 | Chen et al. | ......................... 349/5 |
| 7,170,574 | B2 | 1/2007 | Tan et al. | ....................... 349/117 |
| 7,480,017 | B2 | 1/2009 | Fisher et al. | ..................... 349/96 |
| 2004/0141122 | A1 | 7/2004 | Nakagawa | ....................... 349/117 |
| 2005/0128391 | A1 | 6/2005 | Tan et al. | ....................... 349/117 |
| 2006/0061519 | A1 | 3/2006 | Fisher et al. | ..................... 345/32 |
| 2006/0088668 | A1 | 4/2006 | Tsukoagoshi et al. | ......... 428/1.3 |
| 2007/0070276 | A1 | 3/2007 | Tan et al. | ....................... 349/117 |
| 2008/0192184 | A1 | 8/2008 | Tan et al. | ........................ 349/96 |
| 2009/0002579 | A1 | 1/2009 | Tan | .................................. 349/9 |

OTHER PUBLICATIONS

T. Bachels et al, "Novel Photo-aligned LC-Polymer Wide-View Film for TN Displays", Eurodisplay 2002, 10-3, p. 183-186.
J. Chen et al, "Wide Viewing Angle Photoaligned Plastic Films for TN-LCDs", SID 99, 10-4.
H. Mori et al "Novel Optical Compensation Method Based upon a Discotic Optical Compensation Film for Wide Viewing Angle LCDs", SID 03, 32.3, p. 1058-1061.
European Search Report for corresponding EP application No. 09164273, Nov. 2009.

* cited by examiner

*Primary Examiner* — Dung T Nguyen
*Assistant Examiner* — Tai Duong
(74) *Attorney, Agent, or Firm* — Matthew A. Pequignot; Pequignot + Myers LLC

(57) ABSTRACT

A contrast compensator for improving the panel contrast of liquid crystal (LC) microdisplays having a high-order waveplate configured as an O-plate and supporting a thin film transistor layer is provided. The contrast compensator includes a counter high-order waveplate configured as an O-plate, which has a birefringence opposite in sign to a birefringence of the thin film transistor substrate.

19 Claims, 35 Drawing Sheets

CONTRAST COMPENSATION OF MICRODISPLAY PANELS INCLUDING A HIGH ORDER WAVEPLATE

CROSS-REFERENCE TO RELATED APPLICATIONS

This application claims priority from U.S. Provisional Application No. 61/077,710 filed Jul. 2, 2008, which is hereby incorporated by reference.

TECHNICAL FIELD

The present application relates generally to contrast compensation, and in particular, to contrast compensation of liquid crystal microdisplay panels including a high order waveplate.

BACKGROUND OF THE INVENTION

Liquid crystal (LC) microdisplays are widely found in projections systems, as for example used in business presentations and home entertainment (e.g., large screen televisions). In general, these relatively small displays (e.g., typically measuring less than 1.5" diagonally) are coupled with one or more optical lenses that enlarge the projected image to a suitable display size. Conventionally, LC microdisplays have been based on one of two types of technologies, namely a reflective-type microdisplay (e.g., liquid crystal on silicon (LCoS)) or a transmissive-type microdisplay.

A typical transmissive LC microdisplay includes a layer of liquid crystal material (e.g., vertical-aligned (VA)-mode, in-plane switching (IPS)-mode, planar aligned (PA)-mode, or, more commonly, 90 degree twisted nematic (TN)-mode) sandwiched between front and back transparent plates. The back plate includes a patterned electrode layer, while the front plate includes a common electrode layer, each of which is typically formed from a transparent material such as indium tin oxide (ITO). When 90 degree TN-mode LC is used, the front and back plates typically include alignment layers that are aligned perpendicular to each other such that the LC molecules are arranged in a helical structure or twist. In the absence of an applied voltage (i.e., off-state), the twisted arrangement rotates the polarization of incident linearly polarized light by about 180 degrees. In the presence of a sufficiently large applied voltage (i.e., on-state), the LC molecules begin to untwist such that the polarization of the linearly polarized incident light is not rotated. This LC cell is typically disposed between a polarizer and analyzer having parallel transmission axes (i.e., normally-black) or, more commonly, perpendicular transmission axes (i.e., normally-white).

In commercially available systems, transmissive LC microdisplays typically use an active matrix system, wherein a matrix of thin-film transistors (TFTs) controls the voltage applied by the electrodes. More specifically, each TFT functions as a switching element that controls the orientation of LC in each display pixel. Conventionally, the active TFT layer has been formed by depositing silicon (e.g., amorphous, poly, or crystalline) on a glass back plate. More recently, the advantages of using sapphire as the substrate for the silicon layer have been realized. For example, sapphire exhibits optical transparency in the visible band and is a semiconductor that promotes the growth of single crystal silicon, thus reducing manufacturing complexity and costs. In addition, sapphire is desirable for TFT fabrication because it has high electron and hole mobilities, which enables high speed logic switching. Furthermore, it has higher thermal conductivity than the conventional glass substrates used in high-temperature polysilicon TFTs, thus providing efficient heat dissipation in high brightness illumination systems.

Unfortunately, the use of sapphire as a substrate for LC TFT fabrication has been found to have a negative effect on the panel contrast ratio of LC microdisplays. For example, in U.S. Pat. No. 7,480,017, Fisher et al. teach that the use of sapphire in LC microdisplays de-polarizes the light that passes through the liquid crystal material, reducing the on/off contrast ratio. Fisher et al. teach improving the contrast ratio by incorporating a wire grid or other polarizer on the active silicon back plate to correct for the depolarization of light passing through the sapphire substrate. While the internal polarizer is stated to significantly improve the contrast of a transparent microdisplay built on sapphire substrate, the improvement is achieved at the expense of lost light intensity (e.g., the internal polarizer filters out a portion of the light transmitted through the sapphire substrate having elliptical polarization).

SUMMARY OF THE INVENTION

The instant invention relates to a contrast compensator, which, for example, can be used to improve the panel contrast of liquid crystal (LC) microdisplays having a sapphire plate. The contrast compensator includes a high order waveplate, which has a thickness and symmetry selected to compensate for variations in spectral and angular linear retardance, across the useful wavelength band (e.g., visible) and angle range (e.g., ±12 degrees of cone illumination) found in transparent semiconductor substrates used for LC TFT (e.g., sapphire).

In accordance with one aspect of the invention there is provided a liquid crystal microdisplay comprising: a liquid crystal microdisplay panel including a first substrate, a second substrate, and a liquid crystal layer disposed between the first and second substrates, the first substrate including a first multiple-order waveplate configured as an O-plate and supporting a thin film transistor layer; and, a retarder compensator for compensating for spectral and angular linear retardance dispersions of the first substrate, the retarder compensator including a second multiple-order waveplate configured as an O-plate, the second multiple-order waveplate having a birefringence opposite in sign to a birefringence of the first multiple-order waveplate.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
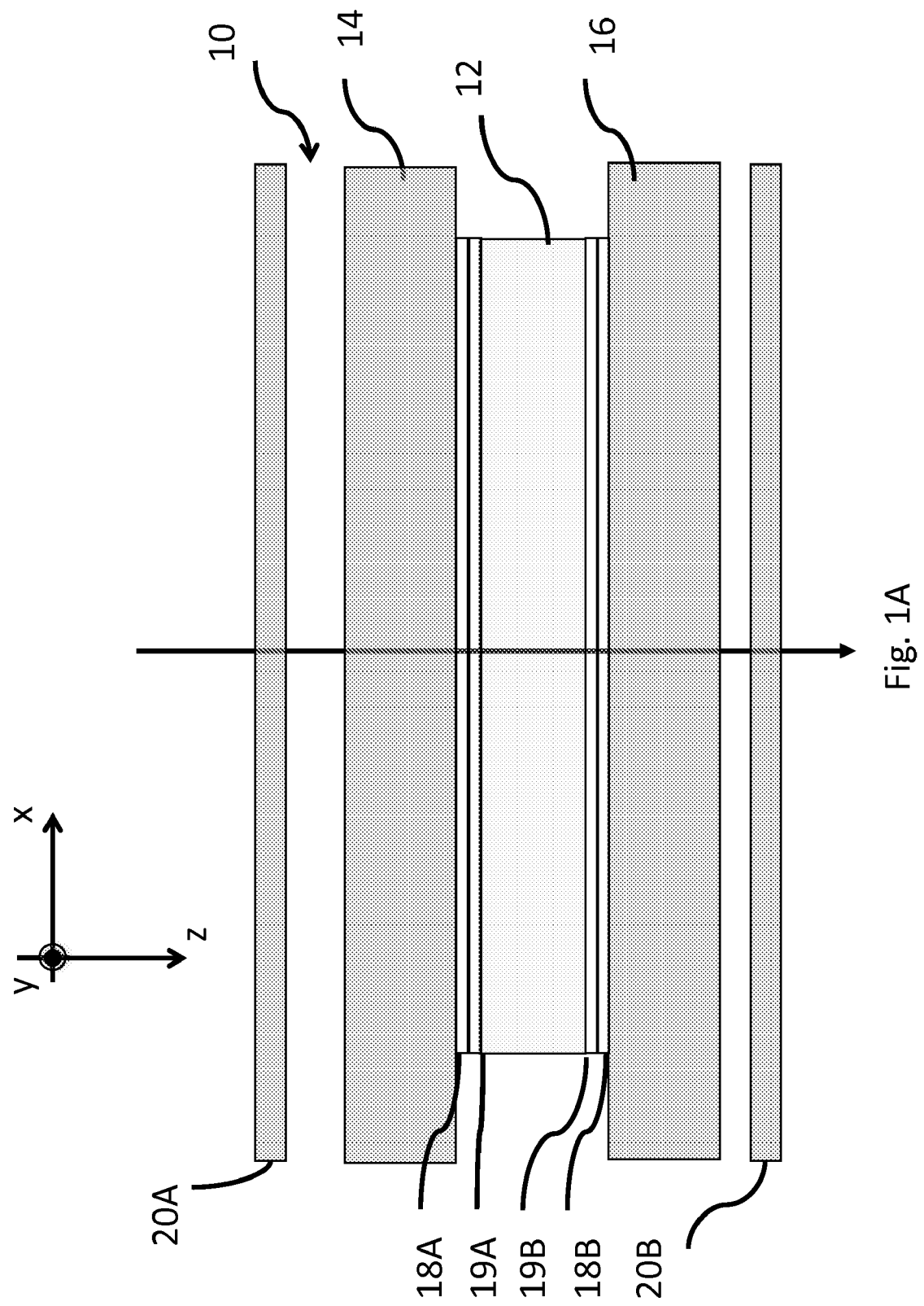
FIG. 1A is a cross-section of a transmissive LC panel.

Panel contrast ratio, which refers generally to the ratio of the light intensity in the bright state to the light intensity of in the dark state, is an important characteristic of LC microdisplays. In conventional 90 degree TN transmissive-type microdisplays, the panel contrast ratio is significantly reduced when the panel is viewed obliquely. The variation in contrast ratio due to viewing angle is typically referred to as the viewing angle characteristic.

In order to improve the panel contrast ratio and/or viewing angle characteristics of transmissive LC microdisplays a retarder compensator is often used. The retarder compensator is typically placed between the polarizer and the LC cell and/or between the analyzer and the LC cell. Optionally, the retarder compensator will include multiple layers of birefringent materials each having different physical thicknesses, optical axis orientation with respect to the liquid crystal and polarizer angles, or sign of birefringence. In fact, in order to provide for efficient contrast enhancement retarder compensators often include one or more A-plates (e.g., a uniaxial birefringent element having its optic axis parallel to the surface of the element), C-plates (e.g., a uniaxial birefringent element having its optic axis normal to the surface of the element), and/or O-plates (e.g., a uniaxial birefringent element having its optic axis at an oblique angle to the surface of the element), each of which may be positive or negative. For example, a retarder compensator used in a VA-mode LC microdisplay may include a tilted O-plate having in-plane retardance and out-of-plane retardance, the latter of which is used for field-of-view (FOV) enhancement, while a retarder compensator used in a TN-mode LC microdisplay may exhibit in-plane retardance, out-of-plane retardance, and circular retardance.

In each case, the retarder compensator is used to compensate for a relatively low-magnitude retardance (e.g., often less than about 50 nm in-plane retardance), which for example, is exhibited by the LC layer in the dark state. Accordingly, retarder compensators are often referred to as trim retarder compensators, or simply trim retarders. Originally, trim retarders were fabricated as compensating films. For example, trim retarders have been fabricated out of stretched organic foil, such as Fuji's Wide View (WV) Film™, which consists of a discotic layer on a triacetate cellulose (TAC) substrate. Other compensating films are discussed, for example, in T. Bachels et al, "Novel Photo-aligned LC-Polymer Wide-View Film for TN Displays", Eurodisplay 2002, 10-3, p 183, J. Chen et al, "Wide Viewing Angle Photoaligned Plastic Films for TN-LCDs", SID 99, 10-4, p and H. Mori et al "Novel Optical Compensation Method Based upon a Discotic Optical Compensation Film for Wide Viewing Angle LCDs", SID 03, 32.3, p. 1058. More recently, the advantages of using form-birefringent thin-film coatings in trim retarders has been realized (e.g., see U.S. Pat. No. 7,170,574 and US Pat. Appl. No. US 20070070276, both of which are hereby incorporated by reference).

Providing the trim retardance with a compensating film and/or thin film coating allows the trim retarder to be fabricated as a true zero-order waveplate. In general, a zero-order waveplate provides only the required phase delay (i.e., a phase delay of only 0.25 waves is provided if the retarder is a zero-order quarter-wave plate). In contrast, a multiple-order waveplate provides a relative phase delay that is larger than the required phase delay by some characteristic value (e.g., an integer multiple of $2\pi$ larger for a full waveplate or an odd integer multiple of $\pi/2$ larger for a quarter waveplate). In principle, a multiple-order wave retarder should behave similarly to a zero-order wave retarder. For example, a tenth-order quarter-wave plate (e.g., 5.25 waves) should behave similarly to a zero-order quarter-wave plate (e.g., 0.25 waves), for a given wavelength. In practice, however, multiple-order waveplates have not been typically used as trim retarders due to their high dispersion and temperature dependence. Notably the high dispersion, which results in not all wavelength channels within the visible band being compensated adequately, is particularly problematic in transmissive LCD projectors, which usually include more than LC microdisplay (e.g., one for each of the blue 460 nm, green 550 nm, and red 620 nm, bands).

Unfortunately, while prior art trim retarders have been shown to improve the contrast of conventional transmissive TN-mode LC microdisplay panels from a few hundred to one to substantially higher, over a relatively wide bandwidth, they have not been successful at significantly improving the contrast ratio and/or viewing angle characteristics when the LC microdisplay includes a sapphire semiconductor substrate.

A sapphire semiconductor substrate is a birefringent crystal plate that is transparent in the visible band. Even though the birefringence of a sapphire plate is relative low (e.g., approximately 0.008 at 550 nm), the thickness required to provide sufficient support in LC cell sandwiching (e.g., a physical thickness between 0.4 mm to 1 mm), will yield several microns of retardance.

In addition, since the R-plane of sapphire is often selected for TFT fabrication, sapphire semiconductor substrates are often configured as O-plates. The R-plane is a crystal cut that yields the optic axis or C-axis alignment of the sapphire at about 57.6 degrees with respect to plate normal. This O-plate configuration means there is a large retardance slope as a function of angle of incidence at viewing planes close to the C-axis tilt plane. The high order retardances gives rise to alternating even and odd retardance order where the effective retardance at normal incidence varies from 0 to $\pi$ several times within the visible band. These retardance variations degrade the achievable panel contrast, and in particular degrade the viewing angle characteristics. For example, degradation will occur through a cross-polarizer setup when the corresponding linear retarder axis is not aligned parallel/perpendicular to the polarizers.

Figure 1B:
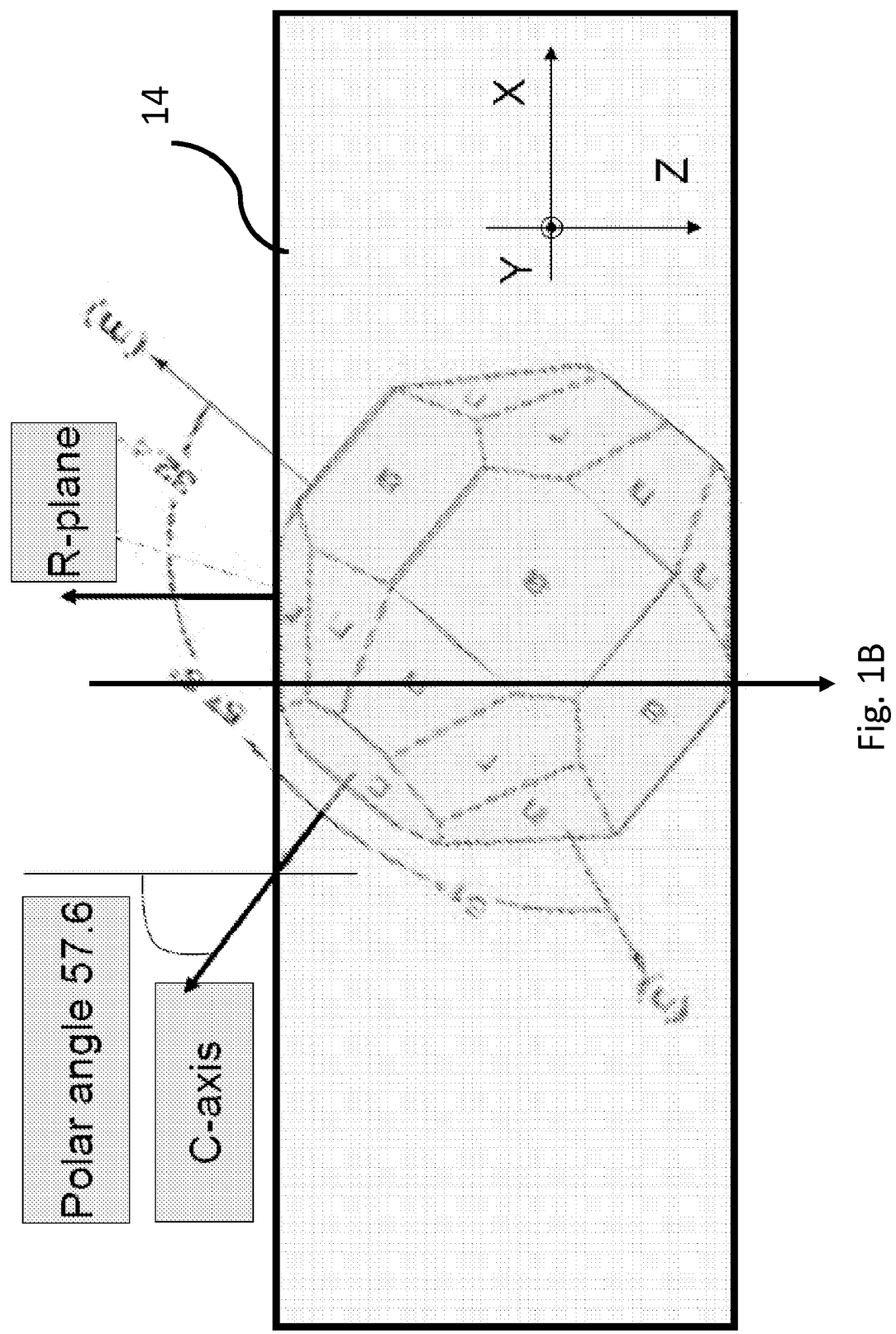
FIG. 1B illustrates the configuration of the high-order sapphire substrate shown in FIG. 1A.

Referring to FIG. 1A there is shown a cross-section of a transmissive LC panel incorporating a sapphire back plate. The transmissive LC panel 10 includes a LC layer 12 sandwiched between the sapphire back plate 14 and a cover plate 16. The LC layer 12 is formed from a LC material such as 90 degree twisted nematic (TN)-mode, vertical-aligned (VA)-mode, in-plane switching (IPS)-mode, or planar aligned (PA)-mode LC. The sapphire back plate 14 is a birefringent crystal plate, which supports an active matrix pixel addressing circuit (not shown) used to control the orientation of the LC director in the LC layer 12. The cover plate 16 is a glass plate. Optionally, depending on the LC-mode, the transmissive LC panel 10 will also include one or more electrodes 18A, 18B and one or more alignment layers 19A, 19B. In general, the transmissive LC panel 10 will be disposed between two polarizers 20A, 20B. When the two polarizers 20A, 20B are oriented such that their transmission axes are perpendicular, then the first polarizer 20A is typically referred to as the polarizer while the second polarizer 20B is referred to as the analyzer. Referring to FIG. 1B, the C-axis of the sapphire substrate 14 is oriented at a polar angle of 57.6 degrees (i.e., its C-axis tilt is at 57.6 degrees from the substrate normal), while the R-plane is coincident with the surface of the plate. The C-axis of the sapphire back plate 14 is typically aligned parallel or perpendicular to the transmission axis of the polarizer 20A.

Figure 2A:
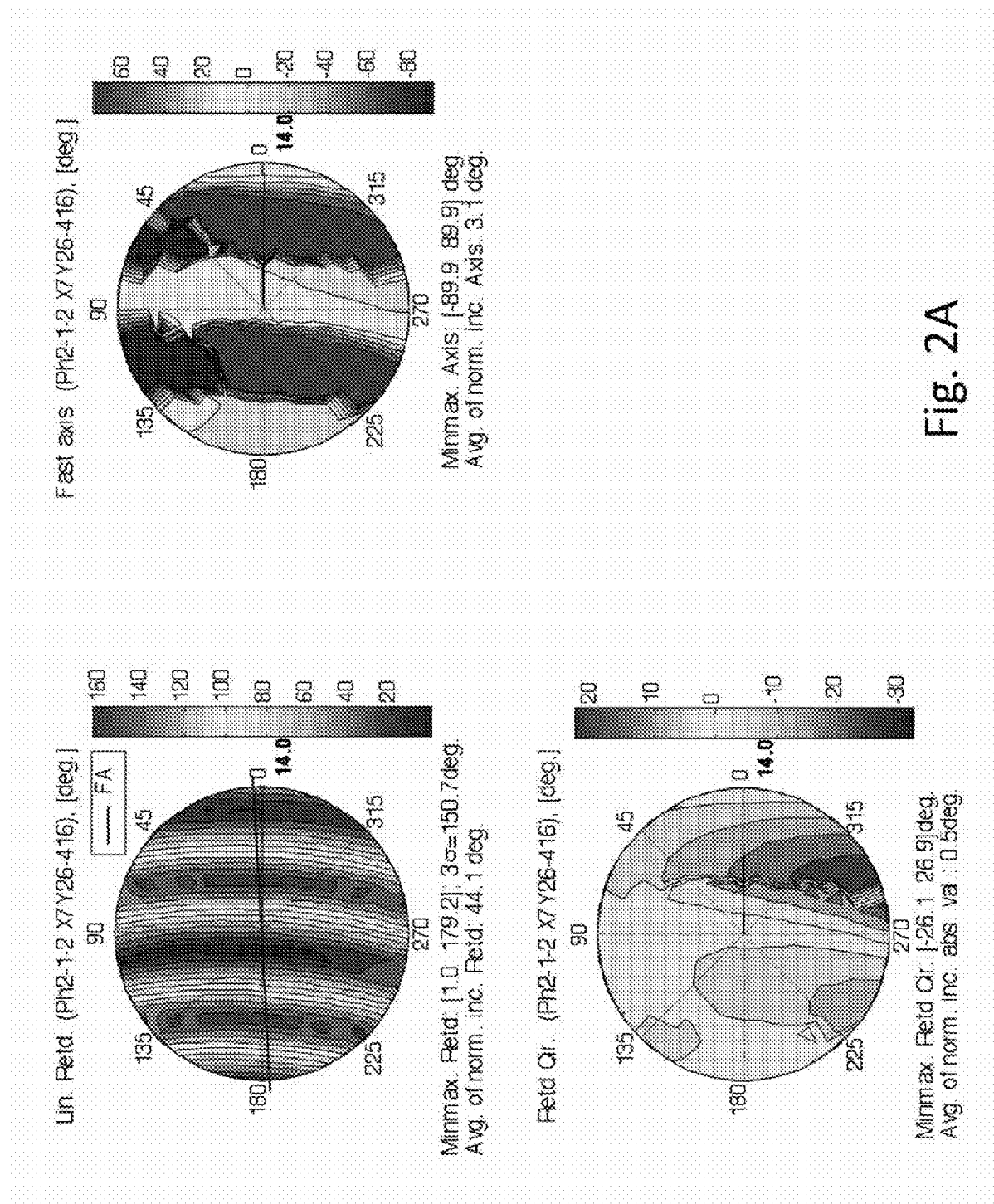
FIG. 2A shows a linear retardance map for an experimental TN-mode LC panel having a high-order sapphire substrate.
Figure 2B:
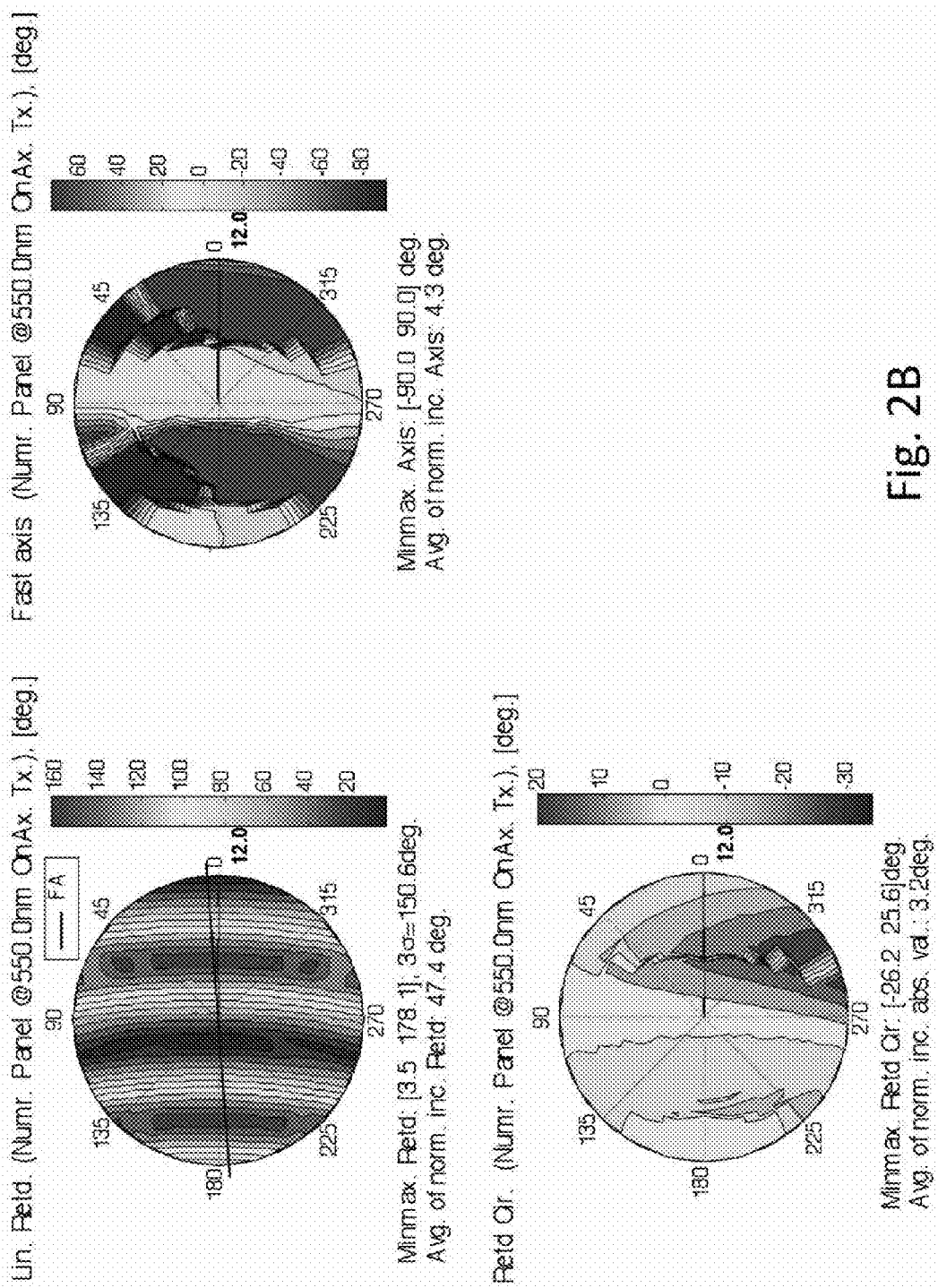
FIG. 2B shows a linear retardance map for a numerical TN-mode LC panel having a high-order sapphire substrate.

Experimental and calculated FOV retardance data for a LC panel 10 similar to that shown in FIG. 1A is shown in FIGS. 2A and 2B, respectively. In each case, the LC layer included TN-mode LC exhibiting about 10 nm in-plane retardance in the dark state, while the sapphire back plate was about 600 microns thick. In the model used to produce the calculated data, the ordinary index, $n_o$, and the extraordinary index, $n_e$, of sapphire were assumed to be 1.7706 and 1.7650, respectively, giving a birefringence, $\Delta n$, equal to $-0.0081$ at 550 nm. Full dispersion over the visible band was utilized. The thickness of the sapphire back plate was 576.6 microns. At this thickness, the sapphire back plate is a $12^{th}$ order waveplate. In other words, the sapphire back plate is a high-order negative O-plate. The net retardance is 45 degrees in the $12^{th}$ order at 530 nm (2205 degrees unwrapped). Referring to both the experimental and calculated results, it is clear that the retardance wrapped to the $0^{th}$ order changes rapidly with polar/azimuthal angles of incidence. Experimentally, the average linear retardance at normal incidence was 44.1 degrees. In the calculations, the average linear retardance at normal incidence was 47.4 degrees.

In accordance with one embodiment of the instant invention, a retarder compensator including a counter birefringent substrate, which is also a high-order waveplate, is used to reduce the wavelength and angle dispersions of retardance introduced by the sapphire substrate, and thus improve the contrast ratio and viewing angle characteristics of the transmissive TN-mode LC microdisplay including the sapphire back plate.

Figure 3:
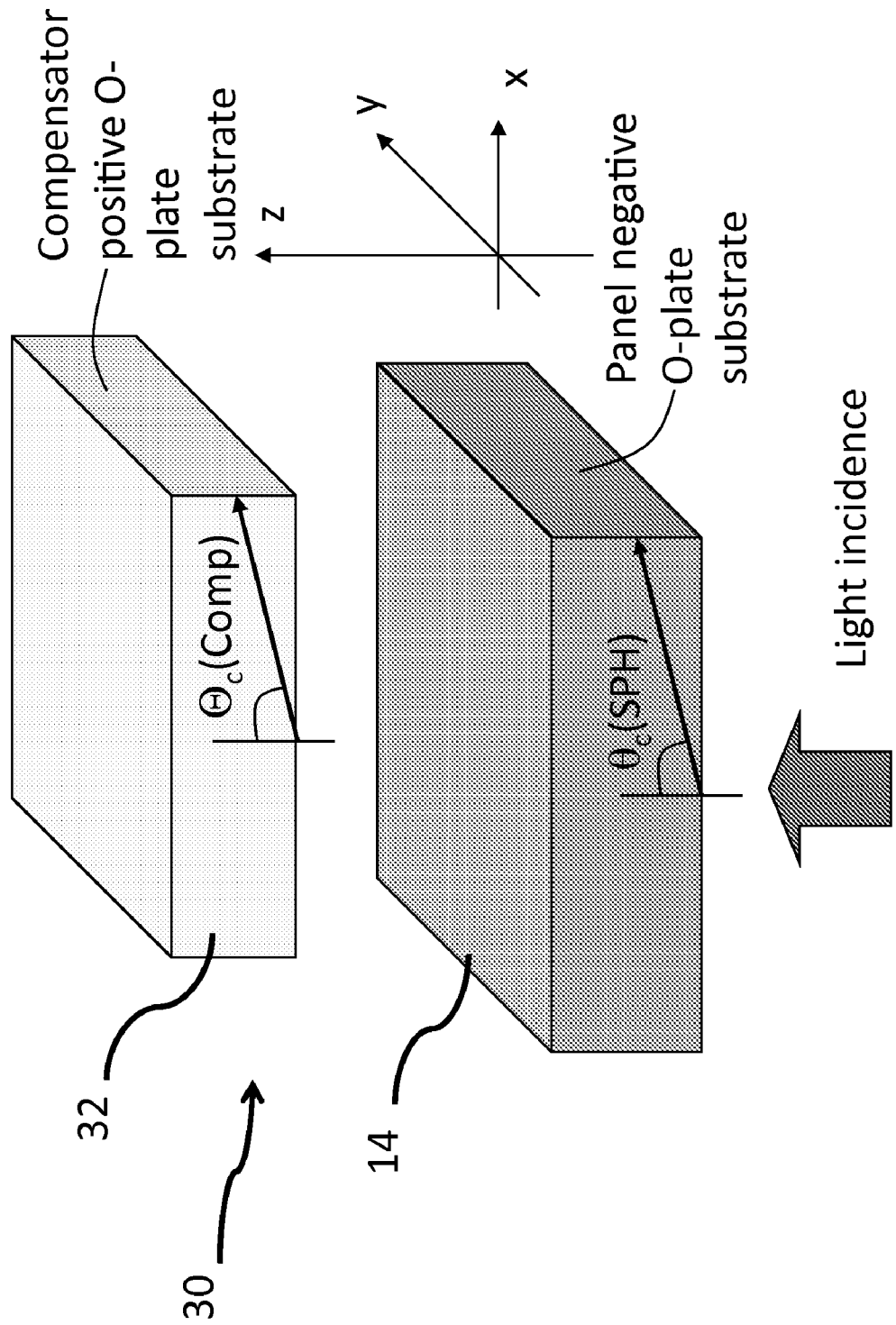
FIG. 3 is a schematic diagram of a retarder compensator in accordance with one embodiment of the instant invention in tandem with a high-order sapphire substrate.

Referring to FIG. 3, the counter birefringent plate 32, which is formed from a material having an opposite sign of birefringence relative to the sapphire substrate 14 (i.e., sapphire exhibits a negative birefringence so the birefringent plate 32 will have a positive birefringence), also has an oblique C-axis alignment versus the substrate normal (i.e., the birefringent plate 32 is a positive O-plate). The birefringent plate 32 is fabricated such that its C-axis orientation and its retardation order substantially complement the spectral and angular linear retardance profiles of the sapphire substrate 14. Accordingly, when the retarder compensator 30 is aligned such that the C-axis of the birefringent plate 32 is aligned along the same tilt plane as the C-axis of the sapphire plate 14, the two substrates function in tandem to significantly reduce the net retardance at all wavelength and angle points (e.g., ideally to zero).

One example of a material that is suitable for fabricating the birefringent plate 32 is quartz. A quartz crystal plate has a positive birefringence and has approximately the same birefringence dispersion as a sapphire crystal plate. Accordingly, with appropriate choices of C-axis alignment and quartz substrate thickness, the compensating plate 32 and the sapphire substrate 14 will function in co-operation to provide for approximately equal and opposite sign retardance at every ray angle and every wavelength of operation. As a result, the system contrast is not negatively affected by the large retardance of the sapphire substrate 14.

In order to determine suitable quartz layer parameters (e.g., thickness and azimuthal and polar angles of the C-axis) the wavelength and angle retardance spectra of a nominal quartz compensating plate were fitted to match that of a nominal sapphire plate. As described above, the ordinary index, $n_o$, and the extraordinary index, $n_e$, of the sapphire plate were assumed to be 1.7706 and 1.7650, respectively, giving a birefringence, $\Delta n$, equal to −0.0081 at 550 nm. The C-axis tilt of the nominal sapphire plate was 57.6 degrees from the substrate normal. The thickness of the sapphire plate was 576.6 microns. For the quartz compensating plate, the ordinary index, $n_o$, and the extraordinary index, $n_e$, were assumed to be 1.5461 and 1.5554, respectively, giving a birefringence, $\Delta n$, equal to +0.0092 at 550 nm. In each case, full dispersion over the visible band was utilized.

Figure 4:
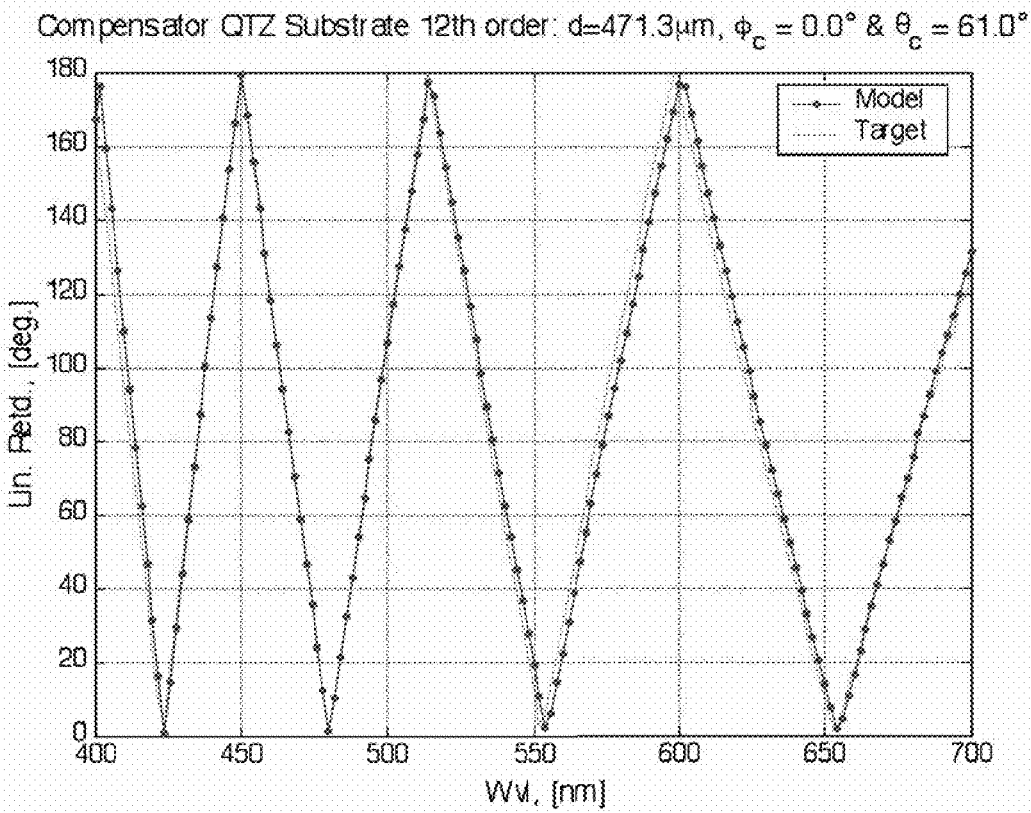
FIG. 4 shows the spectral and angular linear retardance curve fitting results of a quartz retarder compensator and a high-order sapphire substrate.
Figure 4:
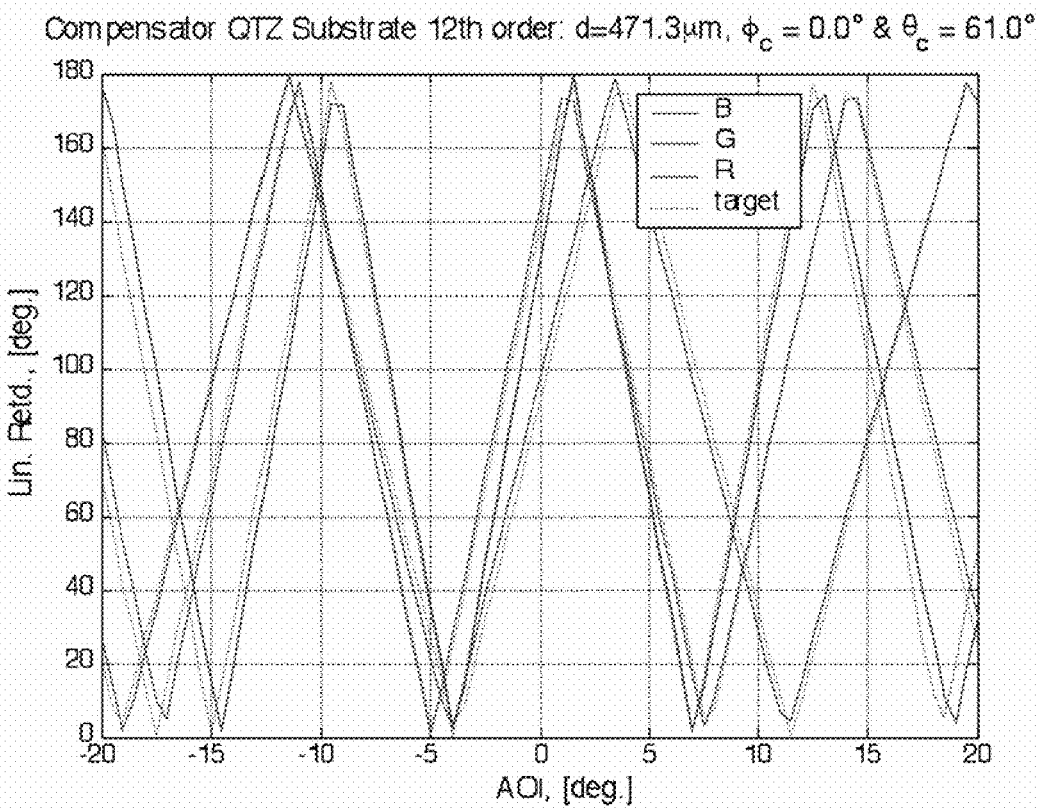

Referring to FIG. 4, it is confirmed that the spectral retardance dispersion (e.g., left-hand plot) and angular retardance dispersion (e.g., right-hand plot) of the quartz and sapphire plates can be simultaneously matched with suitable quartz parameters. For example, numerical results indicate that if the quartz compensating plate has a C-axis tilt that is about 61.1 degrees from the substrate normal and a physical thickness of about 472.0 microns, then the spectral and/or angular retardance dispersions will be substantially matched. Notably, at this thickness, the quartz compensating plate is also a $12^{th}$ order waveplate.

Figure 5:
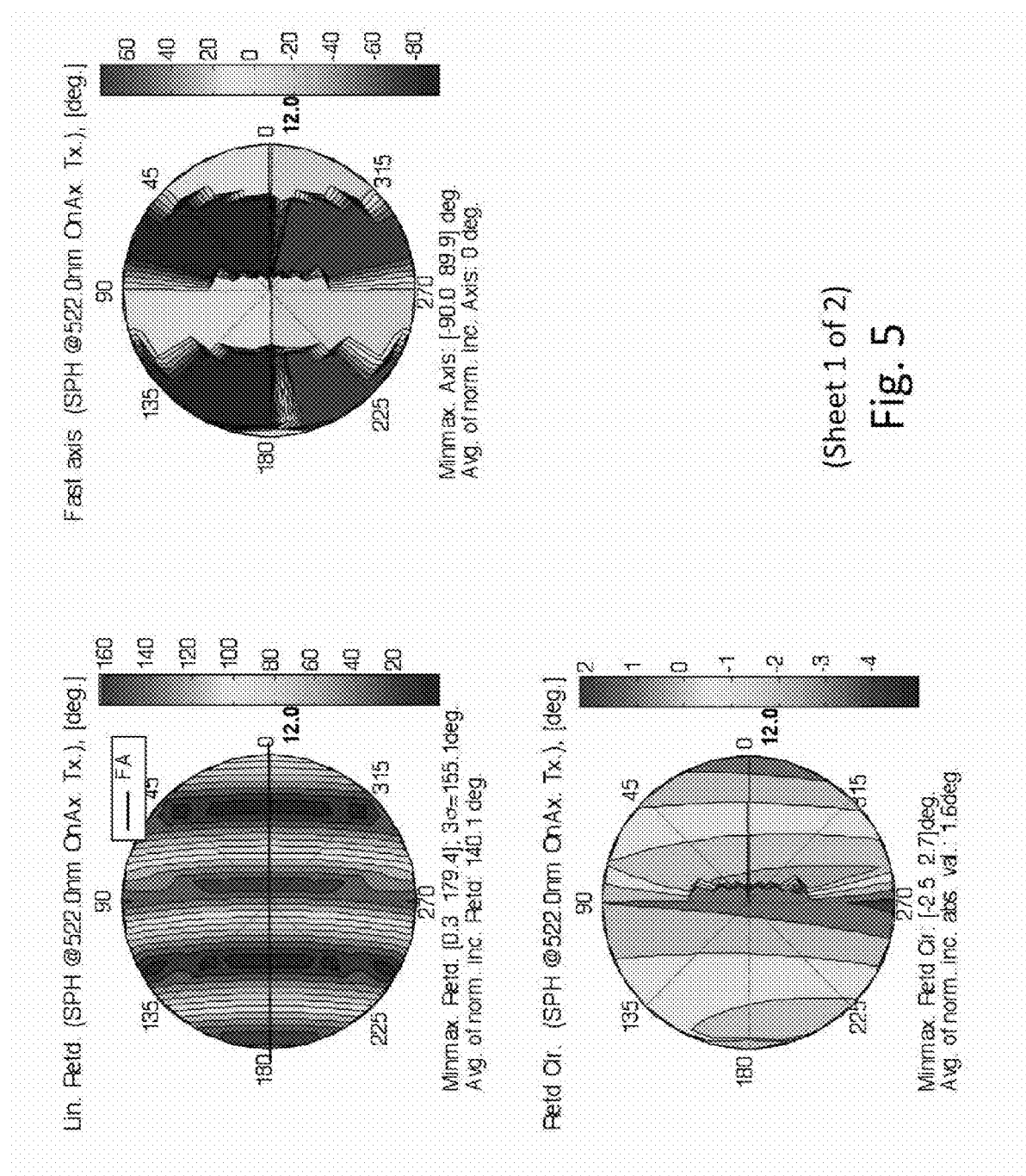
FIG. 5 shows a qualitative comparison of the linear retardance maps calculated for the quartz retarder compensator and the high-order sapphire substrate using modeled retardance data for both the quartz retarder compensator and the high order sapphire substrate.
Figure 5:
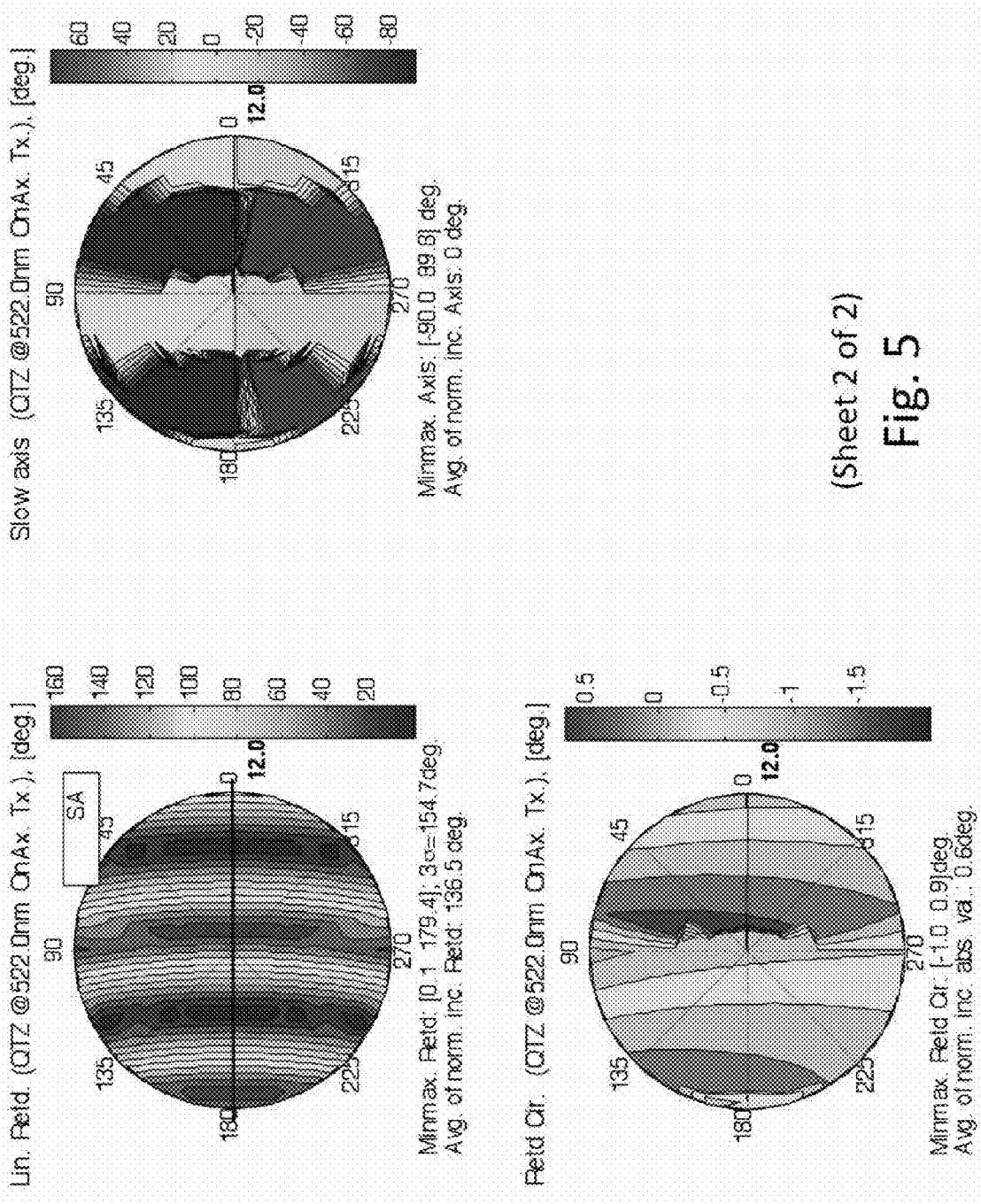

Qualitative comparisons of the 576.6 micron thick sapphire substrate having its C-axis oriented 57.6 degrees from the substrate normal and the 472.0 micron thick quartz compensating plate having its C-axis tilt 61.1 degrees from the plate normal also revealed an excellent conoscopic matching. For example, as illustrated in FIG. 5, the calculated linear retardance (left), slow-axis (center), and circular retardance (right) conoscopic plots for the sapphire (top) and quartz (bottom) plates are shown. Each conoscopic plot shows the retardance component from 0 to 12 degree polar angle of incidence over 360 degrees of azimuthal planes, for incident light at 522 nm.

Figure 6A:
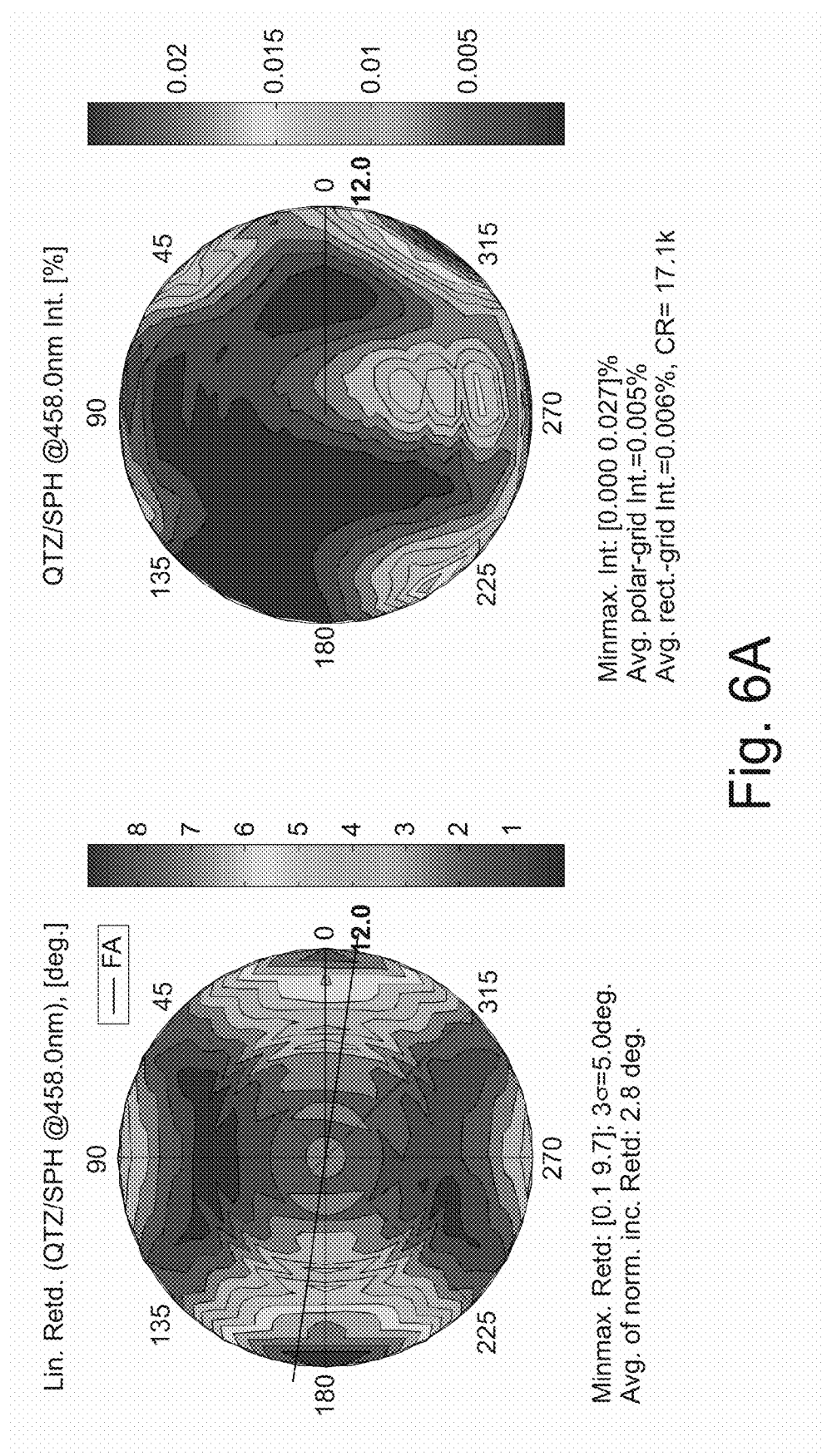
FIG. 6A shows the net retardance and conoscopic leakage calculated for the quartz compensator cascaded with the high-order sapphire substrate in the blue band using modeled retardance data for both the quartz retarder compensator and the high order sapphire substrate.
Figure 6B:
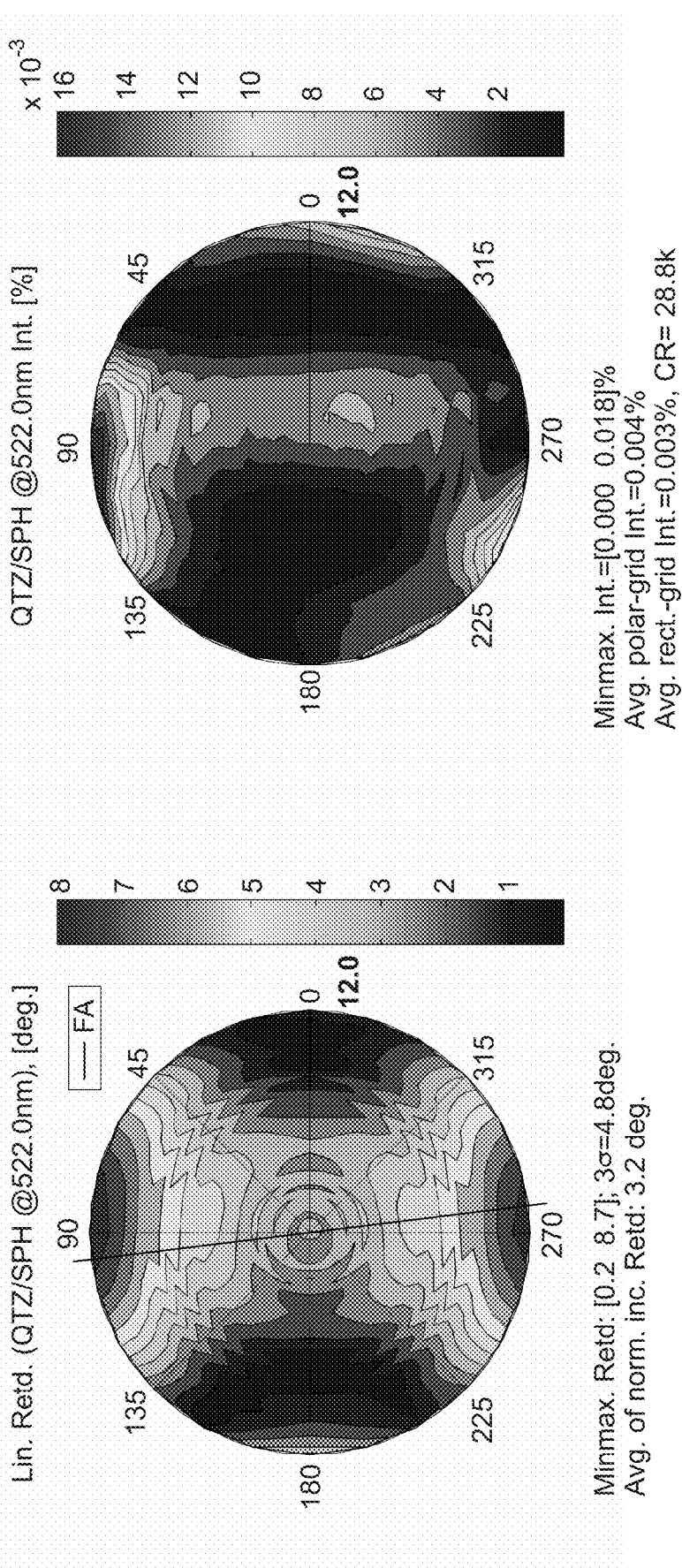
FIG. 6B shows the net retardance and conoscopic leakage calculated for the quartz compensator cascaded with the high-order sapphire substrate in the green band using modeled retardance data for both the quartz retarder compensator and the high order sapphire substrate.
Figure 6C:
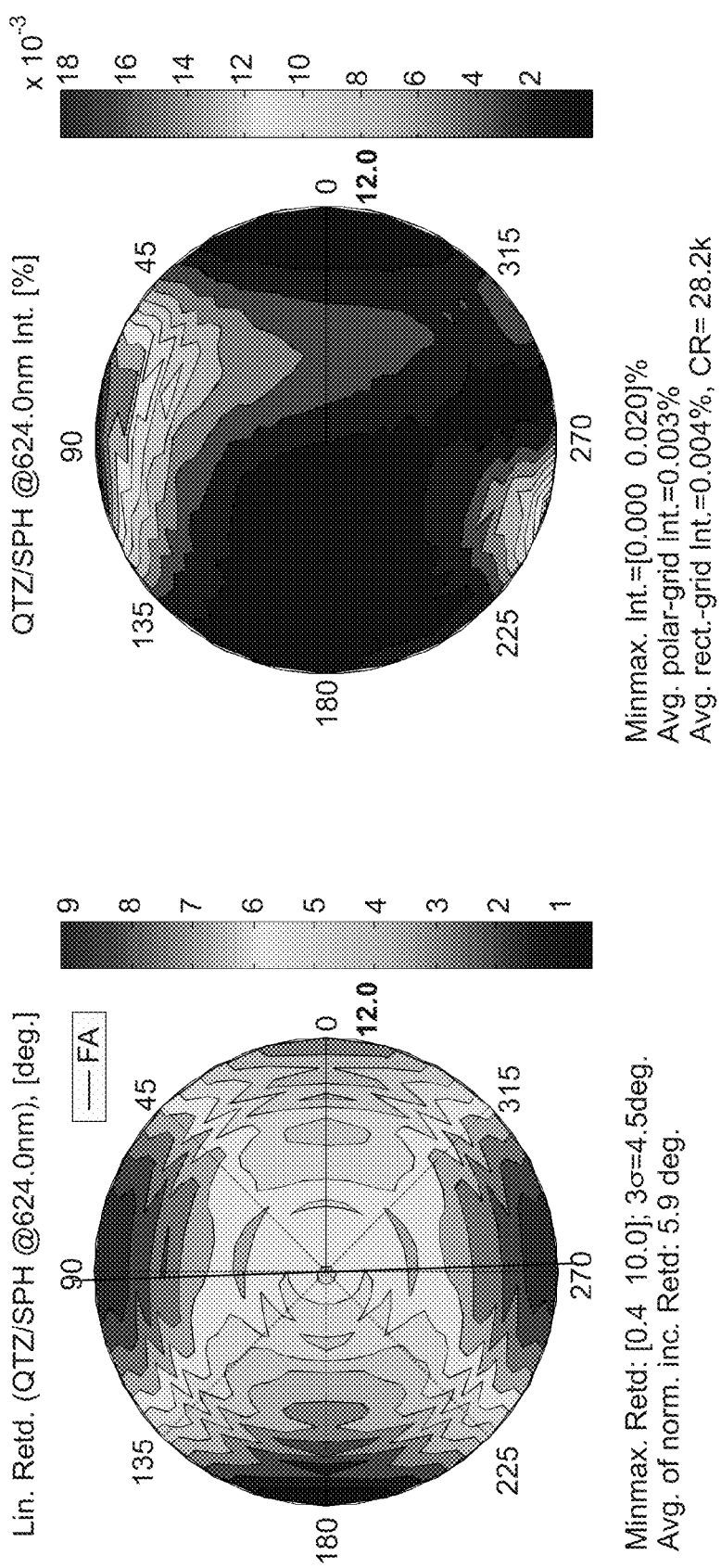
FIG. 6C shows the net retardance and conoscopic leakage calculated for the quartz compensator cascaded with the high-order sapphire substrate in the red band using modeled retardance data for both the quartz retarder compensator and the high order sapphire substrate.

FIGS. 6A, 6B, 6C illustrate the calculated contrast in the blue (e.g., 458 nm), green (e.g., 522 nm), and red (e.g., 624 nm) bands, respectively, when the C-axis azimuthal angle of the sapphire substrate is parallel to the C-axis azimuthal angle of the quartz compensating plate. More specifically, the left-hand plots show the net linear retardance of the sapphire substrate/quartz compensating plate combination (i.e., disregarding other retardation contributions such as from the LC layer and/or the corresponding trim retarder compensator), whereas the right-hand plots show the ideal crossed polarizer raw contrast (e.g., which is not weighted by the system baseline). Referring to the left-hand plots, the average normal incidence retardance is 2.8 degrees for the blue band, 3.2 degrees for the green band, and 5.9 degrees for the red band, indicating that the birefringence compensation is nearly complete. Referring to the right-hand plots, the calculated two-stage contrast ranges from about 17 k in the blue band, 29 k in the green band, and 28 k in the red band. In other words, the modeled single-pass contrast of a two-stage system comprising of a sapphire panel substrate and a quartz compensating plate achieves greater than 20,000:1 in the green and red bands.

Figure 7:
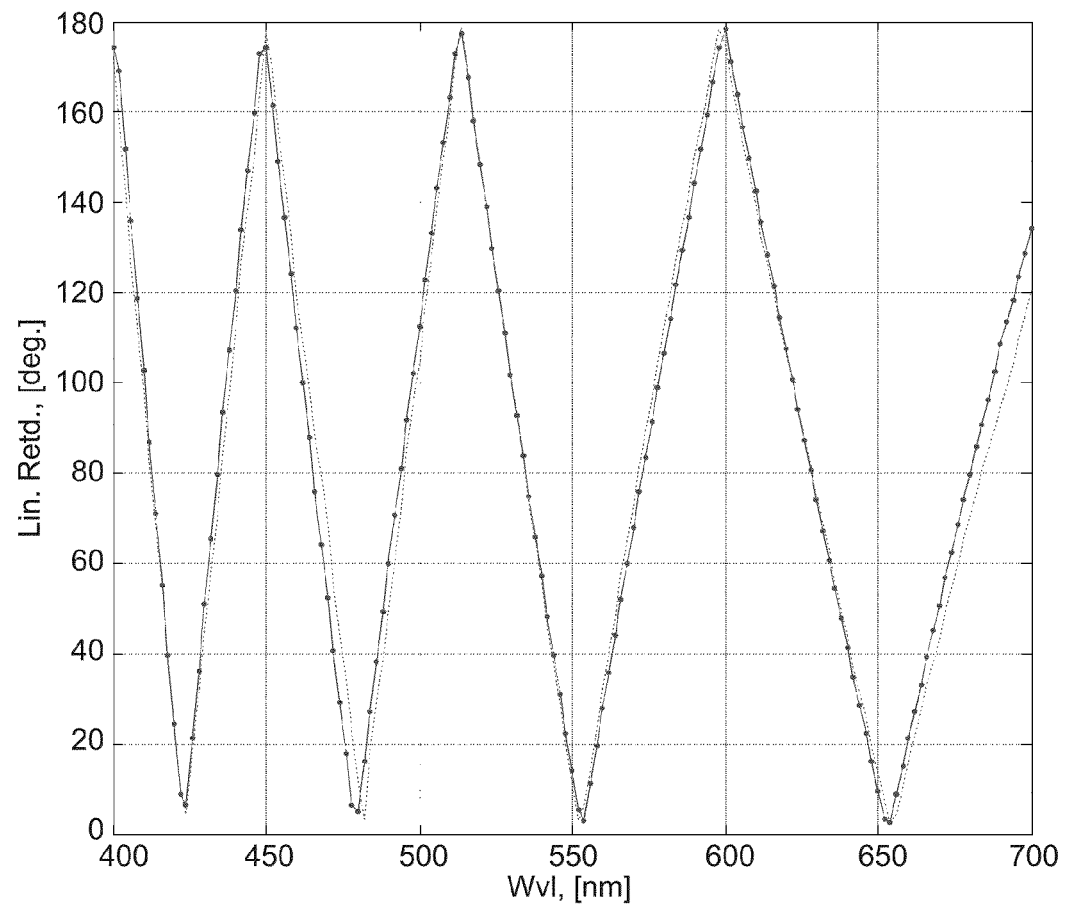
FIG. 7 shows a qualitative comparison of the linear retardance maps for the quartz retarder compensator and the high-order sapphire substrate using experimental retardance data for the high order sapphire substrate.
Figure 7:
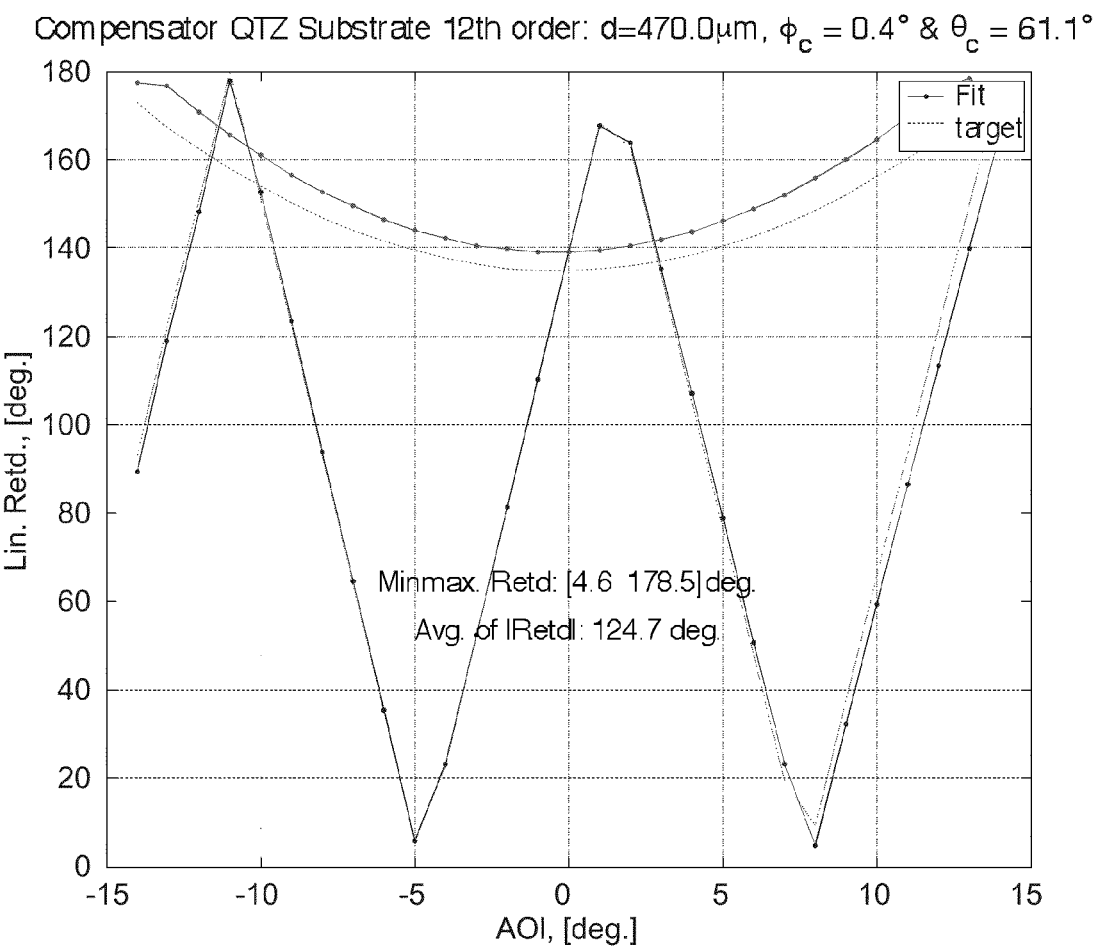
Figure 8A:
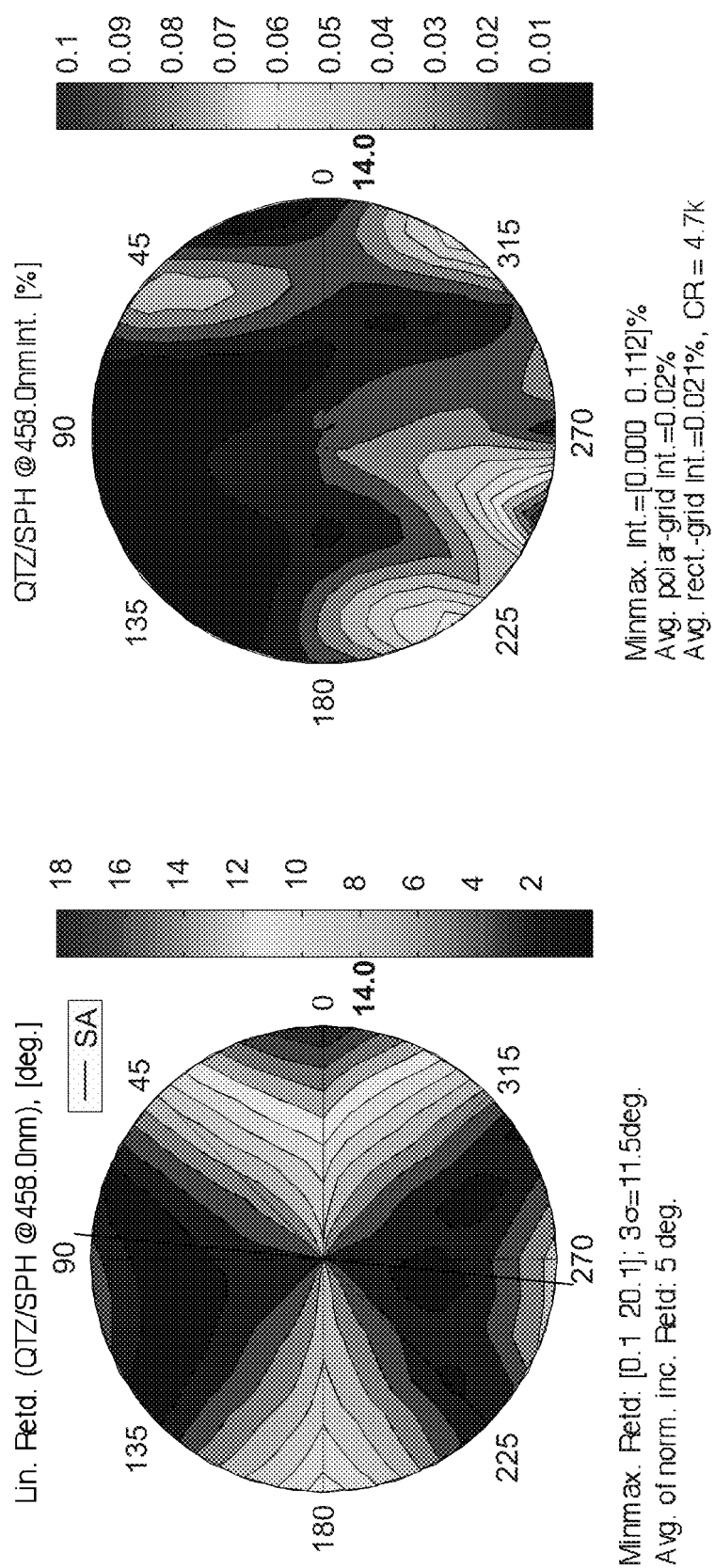
FIG. 8A shows the net retardance and conoscopic leakage for the quartz compensator cascaded with the high-order sapphire substrate in the blue band using experimental retardance data for the high order sapphire substrate.
Figure 8B:
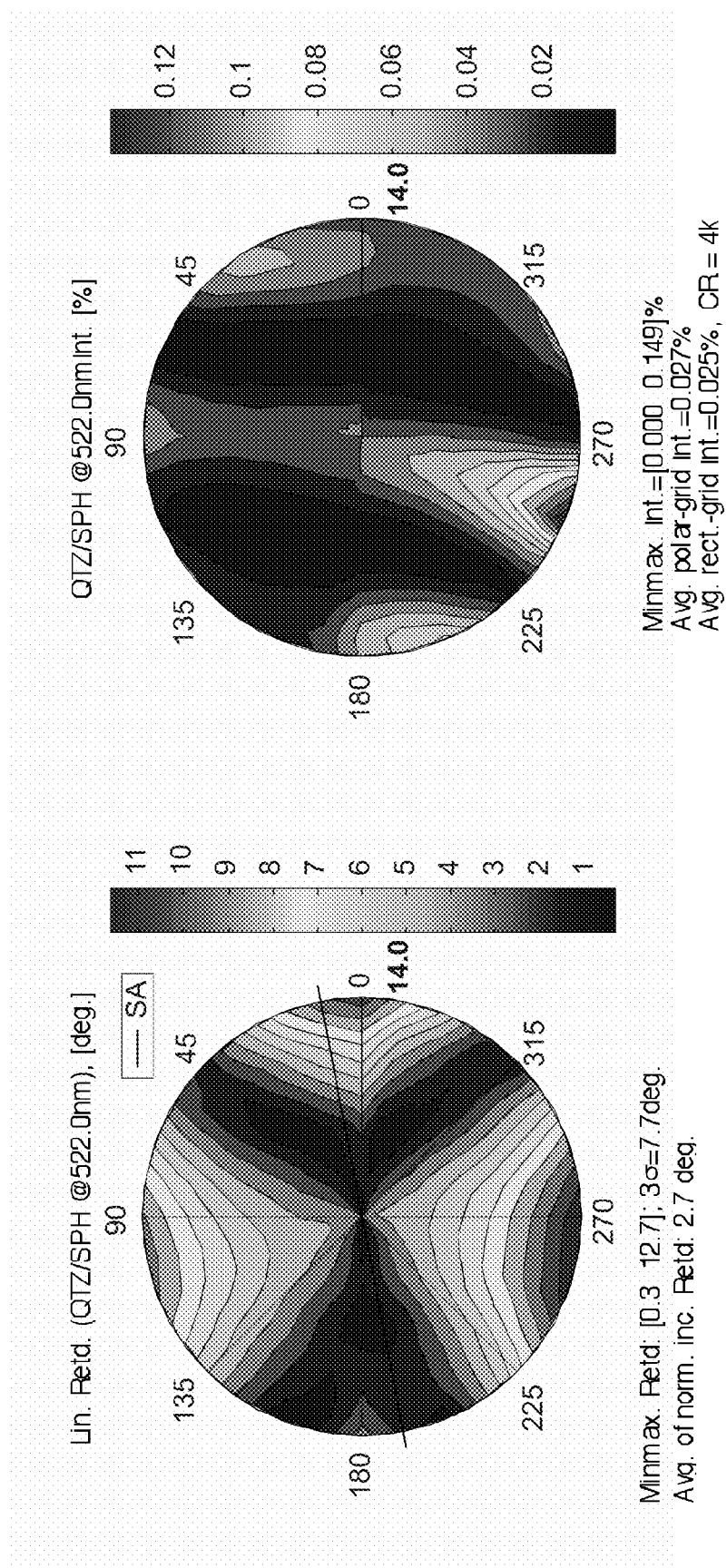
FIG. 8B shows the net retardance and conoscopic leakage for the quartz compensator cascaded with the high-order sapphire substrate in the green band using experimental retardance data for the high order sapphire substrate.
Figure 8C:
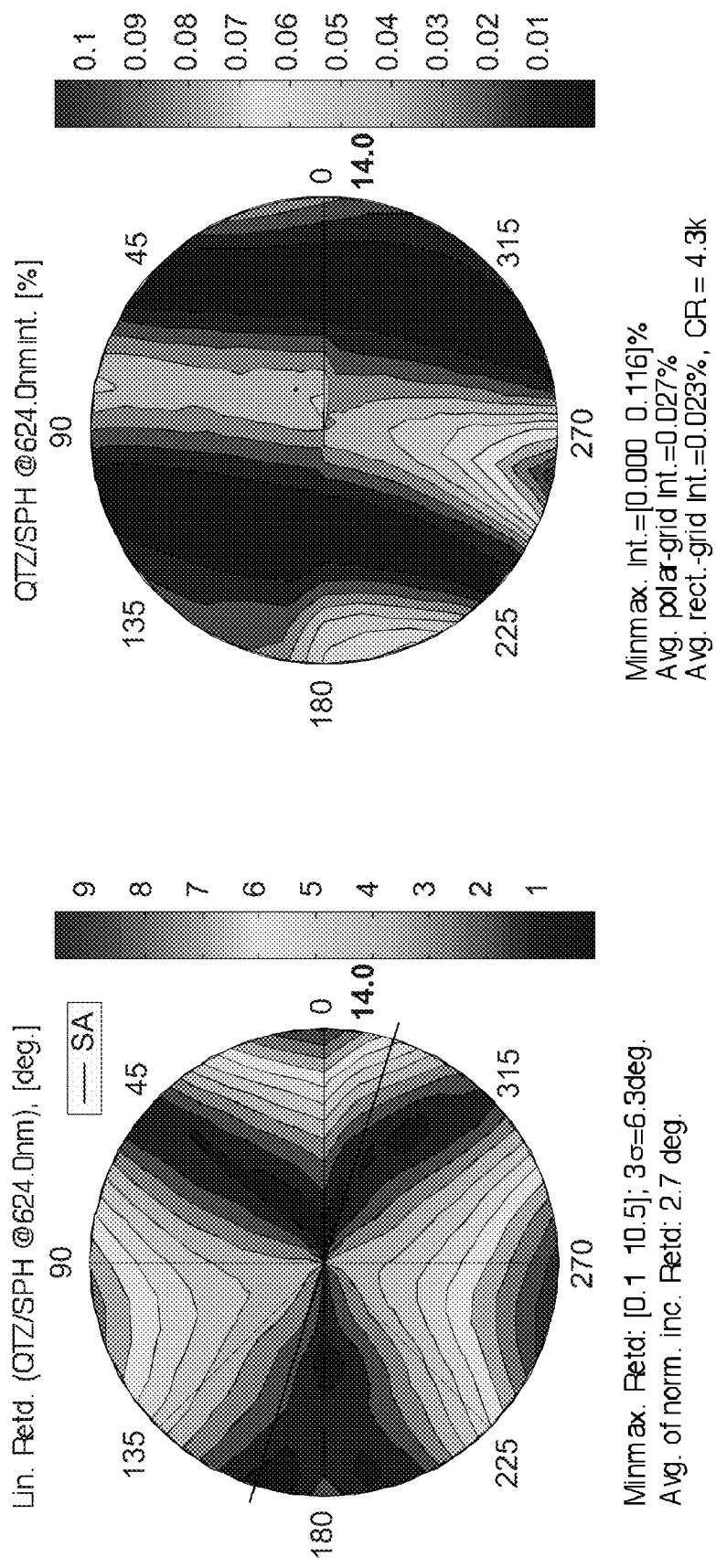
FIG. 8C shows the net retardance and conoscopic leakage for the quartz compensator cascaded with the high-order sapphire substrate in the red band using experimental retardance data for the high order sapphire substrate.

Referring to FIG. 7, the quartz compensating plate parameters were fitted to match experimental retardance data of a sapphire substrate 14. The experimental data was collected with the C-axis plane of the sapphire plate oriented parallel to the X-axis. The experimental spectrum data is shown with the dashed line. Evidently, the spectral retardance dispersion (e.g., left-hand plot) and angular retardance dispersion (e.g., right-hand plot) calculated for quartz and experimentally obtained for sapphire can be also substantially matched. Referring to FIGS. 8A, 8B, and 8C, it is shown that calculated contrast in the blue (e.g., 458 nm), green (e.g., 522 nm), and red (e.g., 624 nm) bands, is 4.7 k, 4.0 k, and 4.3 k, respectively. These calculated cone average contrasts from the combination of experimental/model results are significantly lower than the model only results, which produced a calculated cone average contrast of 17 k, 29 k, and 28 k for the blue, green, and red bands, respectively. The reduced cone contrast may arise from limitations in the numerical model of the sapphire substrate and/or errors in retardance metrology, which does not allow for all ray angles to be perfectly matched to the quartz substrate data.

In an actual projector system, light leakage may arise from non-ideal cross-polarizers, LC/trim retarder match up, and/or sapphire substrate/quartz compensating plate match-up. Nevertheless, this large compensated sapphire substrate contrast increases the upper contrast limits of what can be achieved when the LC layer is complemented with its own retarder (e.g., a trim retarder), either as a stand alone trim retarder assembly or as part of the retarder compensator 30.

Figure 9:
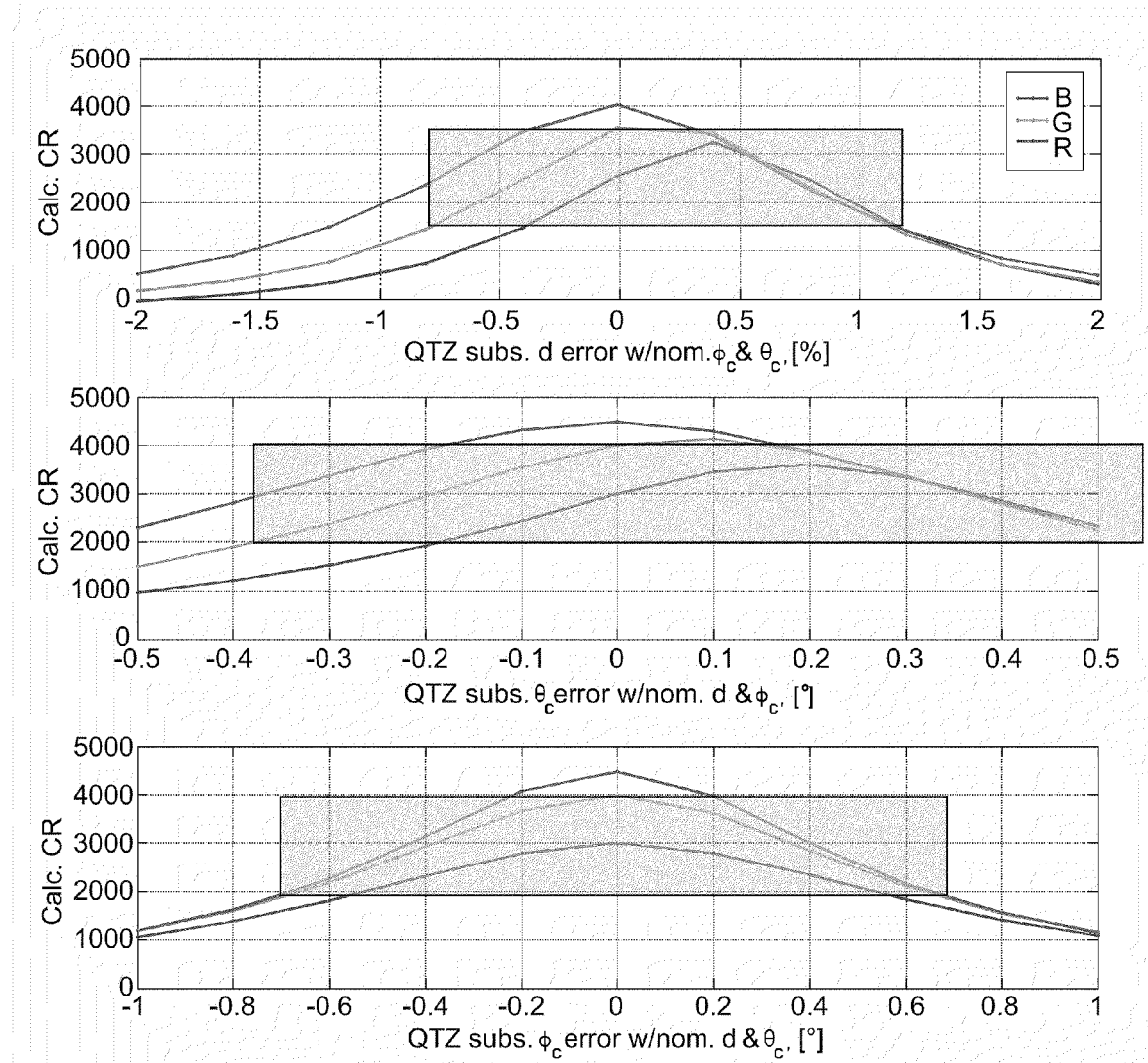
FIG. 9 shows plots of calculated contrast ratio for a range of quartz layer thickness, C-axis polar angles, and C-axis azimuthal angles.

In order to determine the thickness (i.e., d) and C-axis orientation (i.e., polar angle, $\theta_c$, and azimuthal angle, $\phi_c$) tolerance of the compensating plate 32 the contrast ratio in the blue (e.g., 458 nm), green (e.g., 522 nm), and red (e.g., 624 nm) bands, were calculated for a nominal quartz plate. Referring to FIG. 9, the top graph shows the calculated contrast ratio for a quartz plate where the thickness is varied between 469.0±2 microns, the middle graph shows the calculated contrast ratio for a quartz plate where the C-axis tilt or polar angle $\theta_c$ is varied between 61.0±0.5, and the bottom graph shows the contrast ratio calculated when the quartz plate is rotated within the plane of the plate by ±1 degree from the ideal alignment wherein the C-axis of the quartz plate and the sapphire plate are in the same tilt plane. Assuming a baseline contrast of 5 k:1, the calculated contrast ratio results indicate that in order to maintain more than 50% of the peak contrast in the green band, the thickness tolerance of the quartz plate should be ±1%, while the tilt axis tolerance should be ±0.5%. With regard to the azimuthal angle tolerance, the calculated contrast ratios indicate that the quartz c-axis tilt plane should be within ±0.7 degrees of the sapphire tilt plane.

Figure 10:
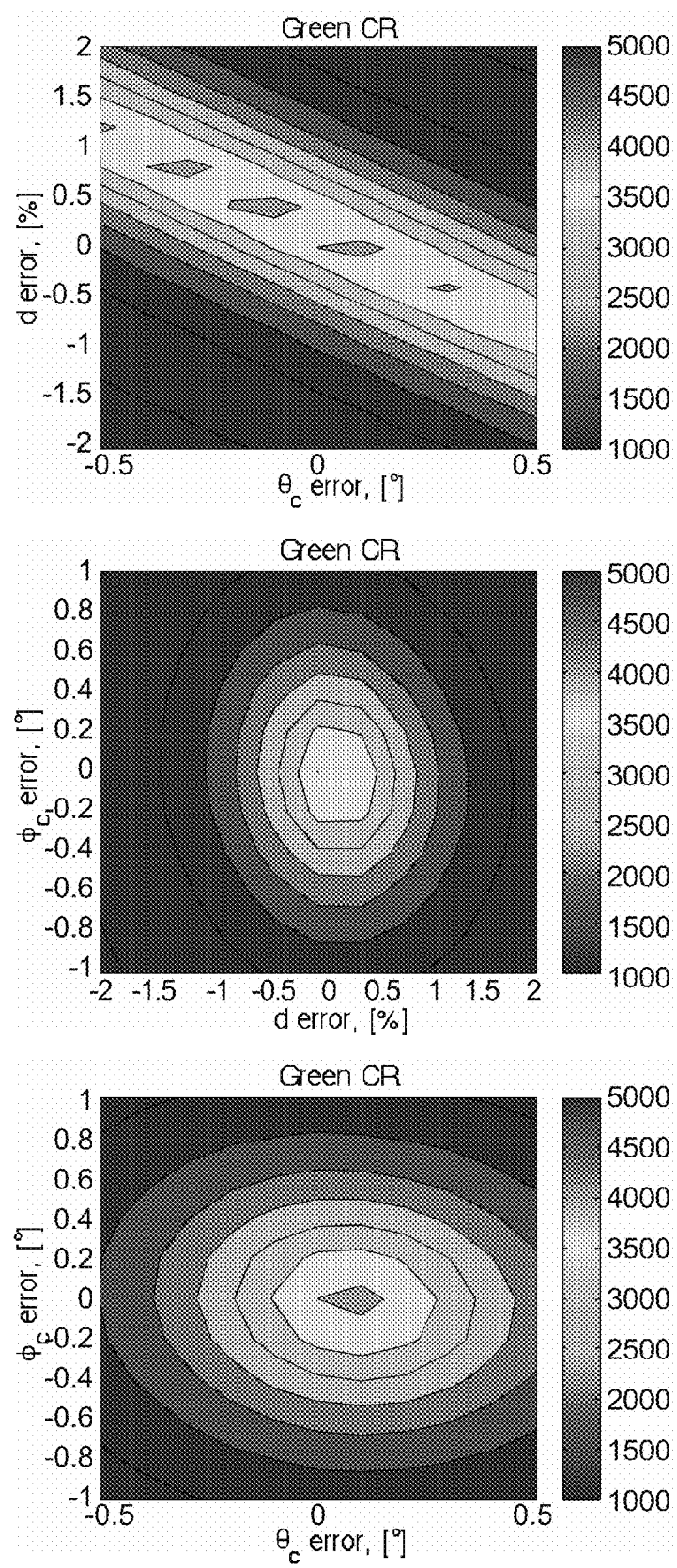
FIG. 10 shows plots of azimuthal angle, polar angle, and thickness tolerances for the cascaded arrangement.

Referring to the contour plots illustrated in FIG. 10, the relationship between thickness, d, polar angle, $\theta_c$, and azimuthal angle, $\phi_c$, errors is shown. The azimuthal angle tolerances shown in the bottom two plots translate into typical Bell-shape contrast roll-off. The relationship between polar angle and substrate thickness errors illustrated in the top plot confirm that the tilt angle and thickness of the compensating quartz plate are dependent on each other in order to provide the required in-plane retardance, and thus improved contrast ratio. In particular, a larger tilt angle will generally be associated with a thinner plate to meet the in-plane retardance requirements, while a smaller tilt angle will yield a thicker plate.

In the calculations discussed above, a quartz O-plate, diced such that the C-axis is about 61 degrees versus the plate normal, provides substantially matched spectral and angular retardation variations to the sapphire substrate used in TFT fabrication, when the quartz plate is about 475 microns thick and the sapphire substrate is about 585 microns thick with a tilt angle of about 58 degrees. At this thickness, the quartz compensating plate is also a $12^{th}$ order retarder yielding about 2,200 degrees of unwrapped linear retardance at λ=550 nm. The C-axis plane of the quartz compensating plate is nominally aligned to the C-axis plane of the sapphire substrate.

Figure 11:
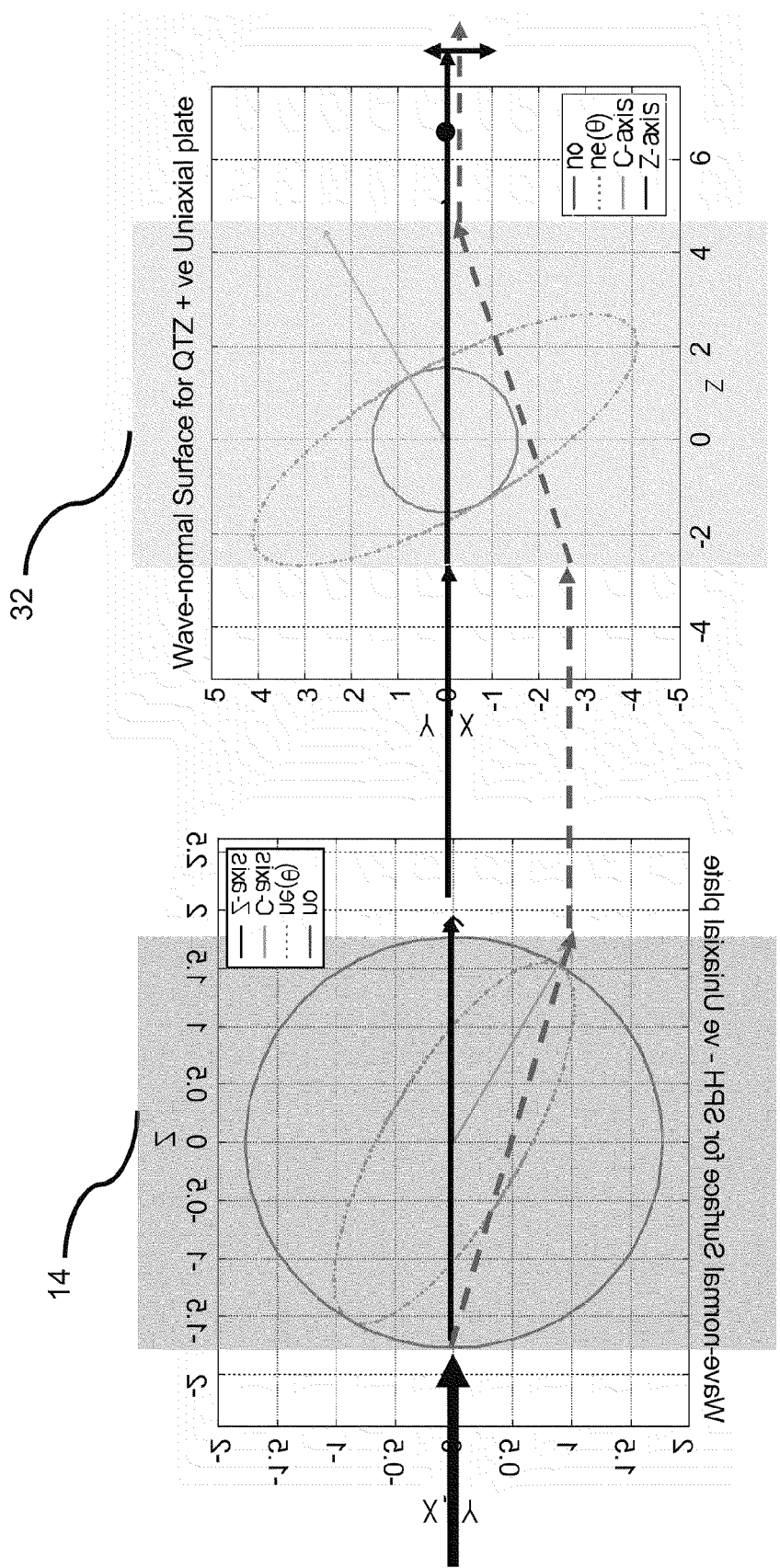
FIG. 11 is a schematic diagram illustrating beam walk-off in thick birefringent crystal plates.
Figure 12:
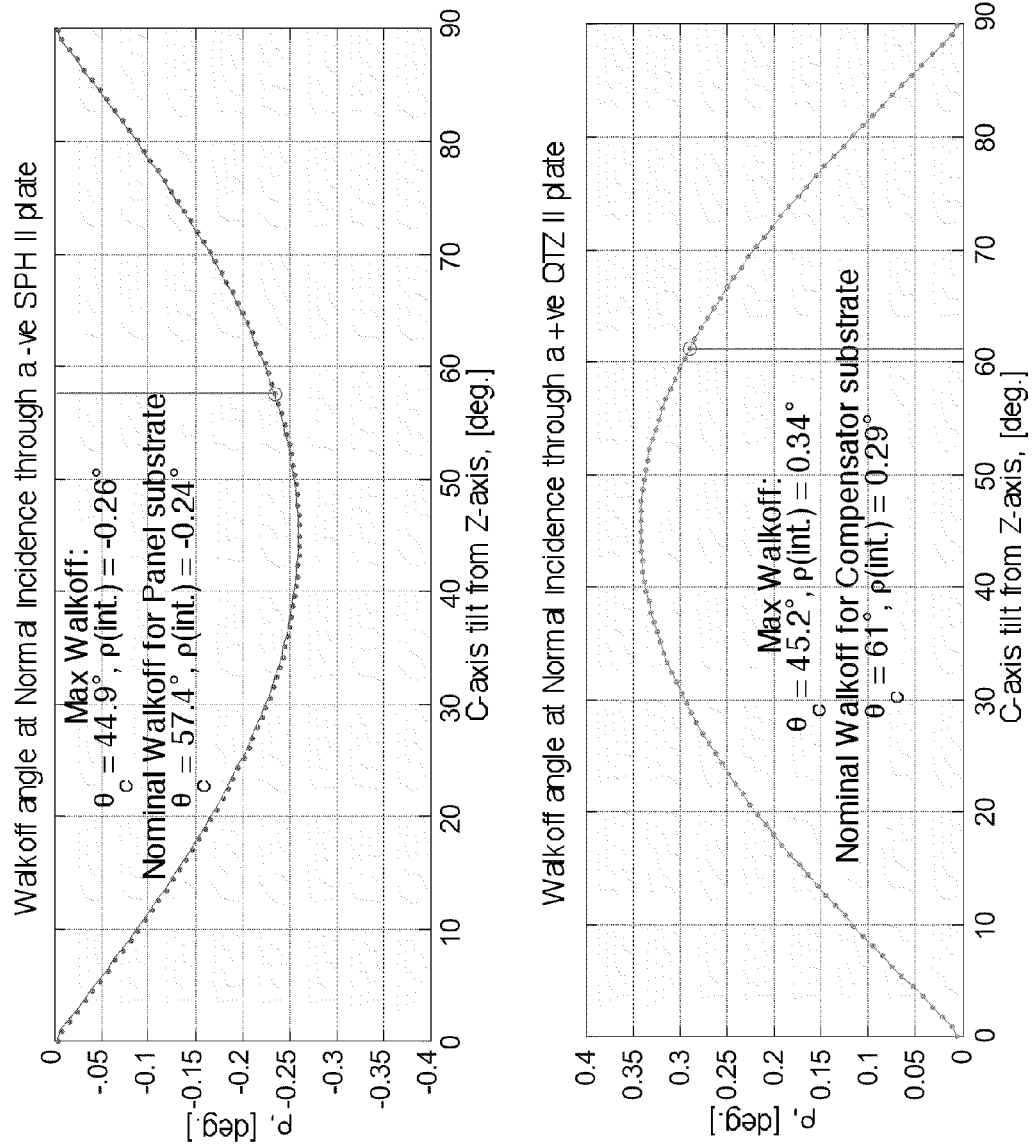
FIG. 12 shows plots of walk-off versus C-axis tilt for high-order sapphire and quartz plates.

In addition to providing substantially matched spectral and angular retardance variations, this two-stage parallel-aligned arrangement also provides image blur compensation. For a TN-mode LC including a sapphire back plate, the substrate-mode extraordinary-wave walk-off from the o-wave direction is about 2.5 microns for a 585 micron thick substrate. Accordingly, depending on the position of the sapphire substrate 14 in the LC cell 10 relative to the incident light, this walk-off may produce two sets of images that are transmitted to the analyzer 20B. Any incomplete extinction of the analyzer of one set of images will result in crosstalk (e.g., image blur). Positioning the quartz compensating plate 32 such that it's C-axis is aligned within the same tilt plane as the C-axis of the sapphire substrate 14 allows the quartz compensating plate to provide walkoff in the opposite direction. FIG. 11 illustrates the walk-off through the relatively thick crystals plates (i.e., where the sapphire substrate 14 has a nominal thickness of 585 microns and the quartz compensating plate has a nominal thickness of 475 microns). Referring to FIG. 12, there is a larger deviation for the quartz plate than the sapphire substrate. However, since the quartz plate is thinner than the sapphire substrate the amount of lateral translation is almost equal for both plates. As a result, the two images are brought together again and the sensitivity to complete extinction of one set of images by the analyser is reduced. Advantageously, the blur compensation makes the contrast ratio less sensitive to whether the microdisplay is illuminated from the sapphire side or from the glass substrate side.

The two-stage compensating system including the sapphire panel 14 and the quartz compensating plate 32 has been modeled and shown to provide an increased contrast ratio. More specifically, the high order quartz waveplate has been shown to remove the variations of spectra and angular linear retardance across the useful wavelength band (e.g., visible) and angle range (e.g., ±12 degrees of cone illumination) found in transparent semiconductor substrates such as sapphire, used for fabricating TFTs in transmissive LC microdisplays. Notably, while the two-stage compensating system has been shown to provide improved contrast, the above-described calculations have not addressed the effects from the birefringent nature of the LC material in the LC microdisplay and/or a trim retarder.

Figure 13A:
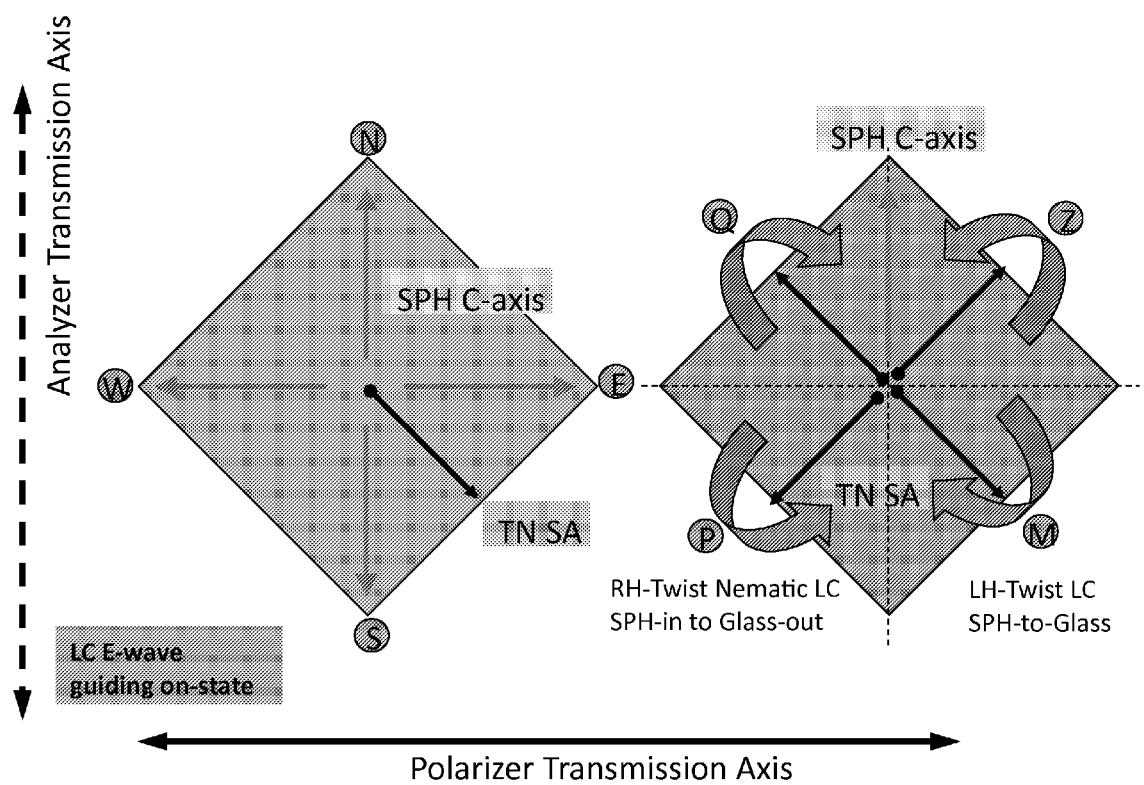
FIG. 13A is a schematic diagram illustrating the sixteen possible combinations of sapphire C-axis and TN LC slow axis orientations.

In order to provide efficient extraordinary-waveguiding in the on-state, the slow axis of the TN layer 12 is typically aligned at a 45 degrees to the transmission axis of the polarizer 20A or analyzer 20B. Referring to FIG. 13A, the possible TN slow axis orientations when the transmission axes of the polarizer and analyser are parallel to the X and Y-axes, respectively, are represented by orientations Z, Q, P, and M. As discussed above, the C-axis of the sapphire back plate 14 is typically aligned parallel or perpendicular to the transmission axis of the analyzer 20B, yielding orientations N, E, S, and W. Accordingly, there are 16 possible combinations of sapphire C-axis orientations and LC slow axis orientations. The contrast ratio of each of these combinations has been modeled and is shown in Table 1. Surprisingly, it has been found that there is a difference of between about 120 to 130:1 bare TN panel contrast to about 80 to 90:1 for less optimal parameters.

TABLE 1

| | Calculated Bare Panel Contrast | | | |
|---|---|---|---|---|
| | TN LC Twist Angle Span and SA Angle | | | |
| SPH C-axis | 45° (Z) | 135° (Q) | 225° (P) | 315° (M) |
| 0° (E) | 121.4 | 85.3 | 97.0 | 91.0 |
| 90° (N) | 102.0 | 97.1 | 106.9 | 129.9 |
| 180° (W) | 122.8 | 91.4 | 104.6 | 89.6 |
| 270° (S) | 115.9 | 120.8 | 82.7 | 97.0 |

Notably, the numerical results indicate that the highest panel contrast over ±14 degree cone illumination is obtained when the C-axis of the sapphire plate is oriented at 90 degrees (i.e., orientation N) and when the TN panel slow axis substantially bisects the fourth quadrant (i.e., is oriented at −45 degrees, which corresponds to orientation M). In fact, when the C-axis of the sapphire plate is oriented north (i.e., at 90 degrees), the calculated contrast ratio for the bare TN panel having its slow axis in the first, second, third and fourth quadrants of the panel are about 102, 97, 107, and 130:1, respectively. In other words, providing a LC panel having its slow axis in the fourth quadrant results in between 22% to 34% better contrast.

In the model used to calculate the bare panel contrast, the sapphire substrate 14 is configured as a high order negative O-plate having a 576.6 micron thickness and having a C-axis tilt 57.6 degrees from the surface normal. The LC-layer 12 is assumed to be part of a normally-white TN90 cell designed to provide for adiabatic waveguiding in the on-state (e.g., undriven) as extraordinary-waveguiding. In the absence of an applied voltage, the polarization of the incident light rotates with the twist angle of the LC molecules, which undergo a smooth 90 degree twist, such that the transmitted light is emitted with a polarization orthogonal to the polarization of the incident light. In the off- or dark-state, the electrostatic field generated by the applied voltage aligns the LC directors along the transmission axis of the cell (e.g., homeotropic alignment) such that the polarization of the incident light does not change upon passing through the LC cell. Note that while the entire cell is often described as having homeotropic alignment in the off-state, it is generally only the interior or mid-section of the LC cell that is truly homeotropic, since the LC directors close to the exit and entrance sections of the cell are influenced by the anchoring forces of the alignment layers. In the model, this intrinsic birefringence of the TN-mode LC layer in the dark state is assumed to correspond to about 10 nm of residual in-plane retardance in the green band (e.g., at 550 nm).

Figures 13B, 13C:
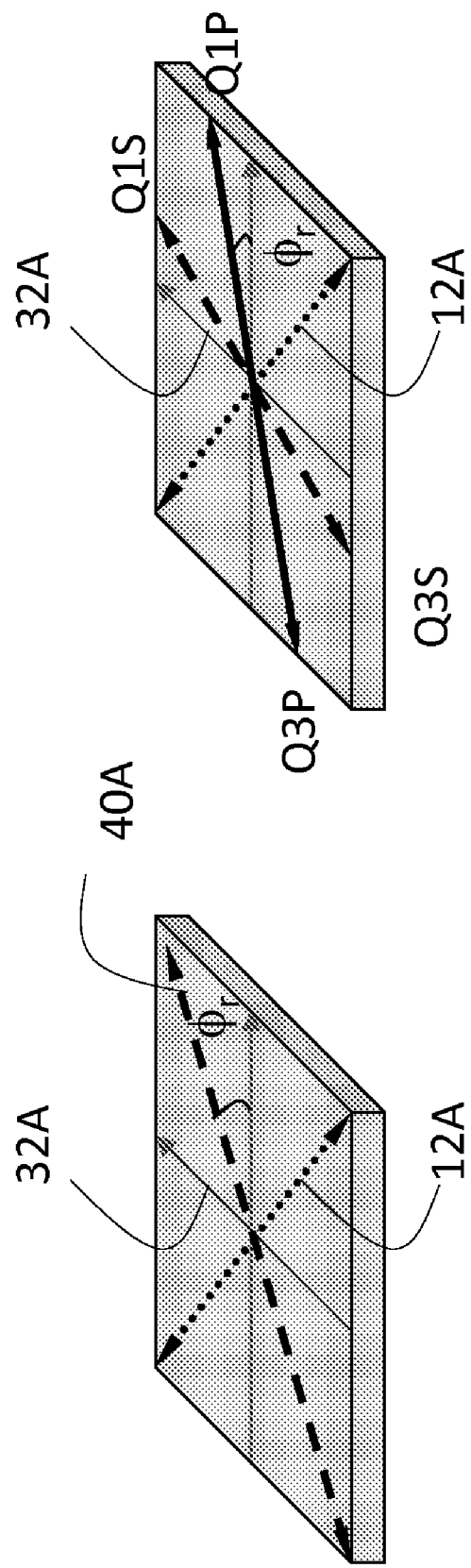
FIG. 13B is a schematic diagram illustrating the slow axis orientation of the trim retarder when the retardances are matched.
FIG. 13C is a schematic diagram illustrating possible slow axis orientations of the trim retarder when the retardances are mismatched.
Figure 14:
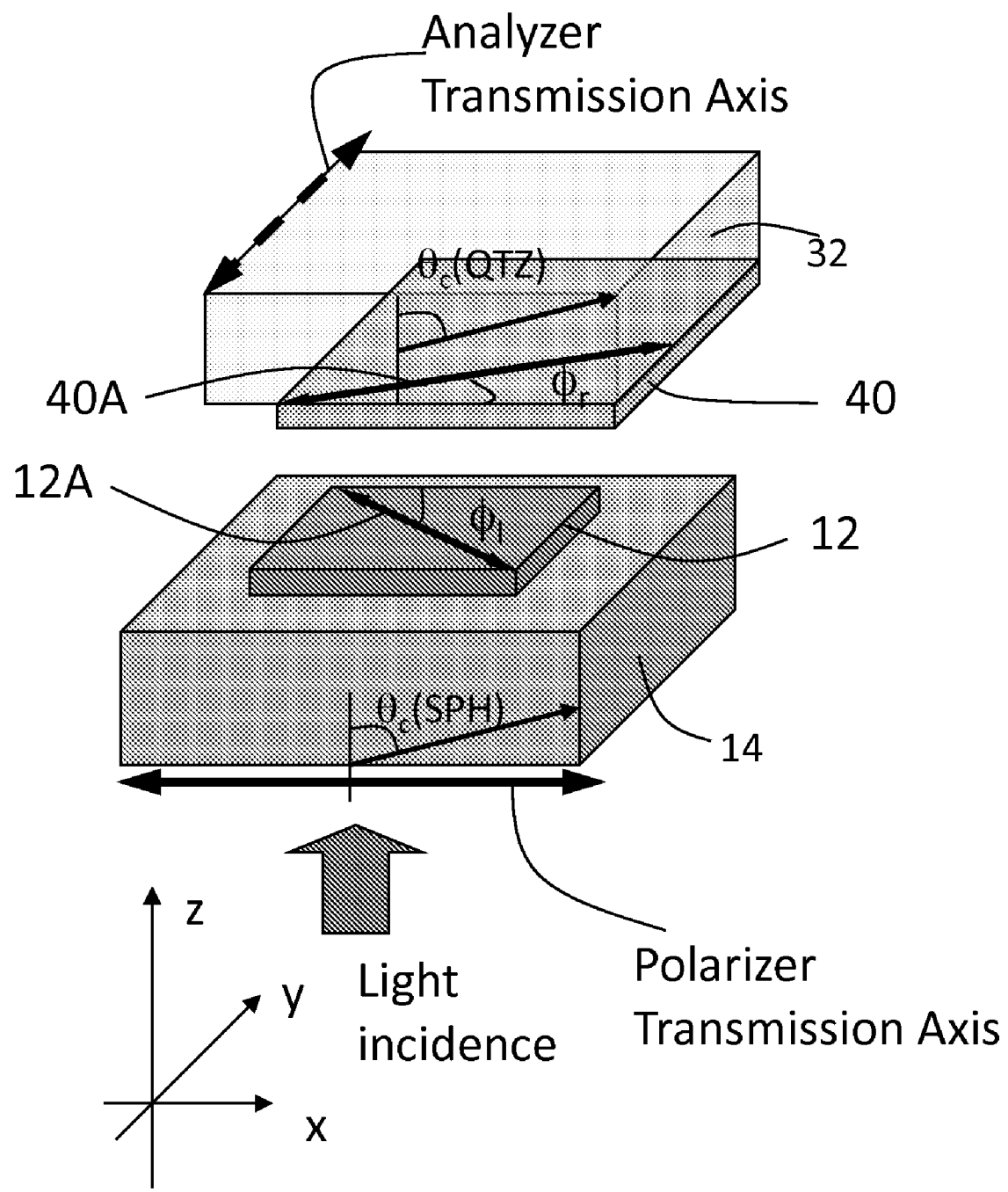
FIG. 14 is a schematic diagram of a retarder compensator in accordance with one embodiment of the instant invention in tandem with a trim retarder, the TN-mode LC layer, and the high-order sapphire substrate.

As described above, the trim retarder 40 is often used to compensate for the residual in-plane retardance of the TN-mode LC in the dark state. In theory, the trim retarder 40 should have the same in-plane retardance exhibited by the TN90 panel in the dark state. Accordingly, when the slow axis 40A of the trim retarder is configured at orthogonal azimuthal orientation to the slow axis 12A of the LC panel then the net effect is zero relative delay for the incoming polarization. In practice, however, it is more common to design the trim retarder 40 to have a higher in-plane retardance than the LC panel in order to accommodate for retardance variations due to manufacturing tolerances (e.g., in device thickness, etc.) and/or operational drifts (e.g., temperature, mechanical stress, etc.). As is known to those skilled in the art, this mismatch in in-plane retardance requires offsetting of the slow axis 40A of the trim retarder relative to the nominal crossed axes configuration. In other words, the trim retarder is 'clocked-in' by rotating its azimuth orientation away from the crossed-axes configuration illustrated in FIG. 13B (e.g., where $\phi_r$ is equal to about 45 degrees) to one of four orientations (e.g., Q1P, Q1S, Q3P, Q3S).

Referring to FIGS. 14-18, contrast compensation including birefringent effects from the LC panel layer 12 and a trim retarder 40 have been modeled. In the model, the sapphire substrate 14 is configured as a high order negative O-plate having a 576.6 micron thickness and having a C-axis tilt 57.6 degrees from the surface normal. The quartz compensating plate 32 is assumed to be configured as a high order positive O-plate having a thickness and C-axis tilt selected to substantially match the linear retardance spectral and angular variations of the sapphire substrate 14. In general, the term high order is used to describe orders greater than 0, and more typically greater than about 2. The slow axis of each of the O-plate retarders 14, 32 is aligned parallel to the XZ plane (i.e., the C-axis of both the sapphire plate 14 and the quartz plate 32 are aligned with an azimuthal angle, $\phi_c$, of about 0 degrees). The LC-layer 12 is assumed to be part of a normally-white TN90 cell designed to provide for adiabatic waveguiding in the on-state (e.g., undriven) as extraordinary-waveguiding. The alignment layers of the TN90 cell are arranged such that the LC molecules follow a counter clockwise (CCW) from the light input side to the light output side. The slow axis 12A of the TN-mode LC layer is aligned such that it approximately bisects the $4^{th}$ quadrant of the TN90 panel. The intrinsic birefringence of the TN-mode LC layer in the dark state is assumed to correspond to about 10 nm of residual in-plane retardance in the green band (e.g., at 550 nm). The trim retarder 40 is assumed to be a single layer A-plate or O-plate that provides about 15 nm of in-plane retardance. The slow axis 40A of the trim retarder is clocked such that it is approximately 25 degrees CCW from the X-axis or 25 degrees clockwise (CW) from the Y-axis. More specifically, the slow axis 40A of the trim retarder is aligned in one of the four orientations illustrated in FIG. 13C (i.e., Q1P, Q1S, Q3P, Q3S, where $\phi_r$ is equal to 25 degrees).

Figure 15:
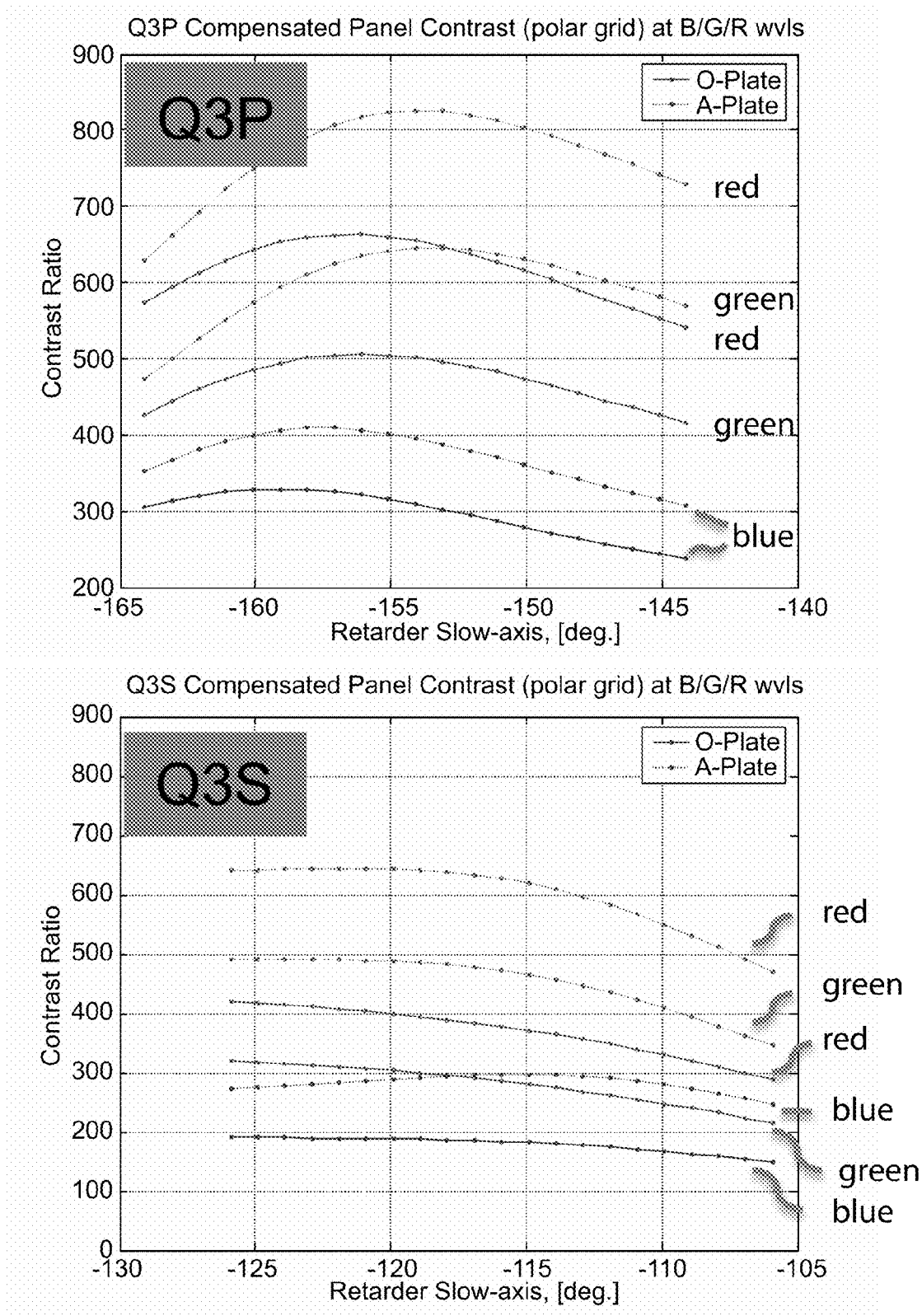
FIG. 15 shows plots of contrast ratio versus retarder slow axis for the possible slow axis orientations of the trim retarder, when the trim retarder is a single layer A-plate.
Figure 15:
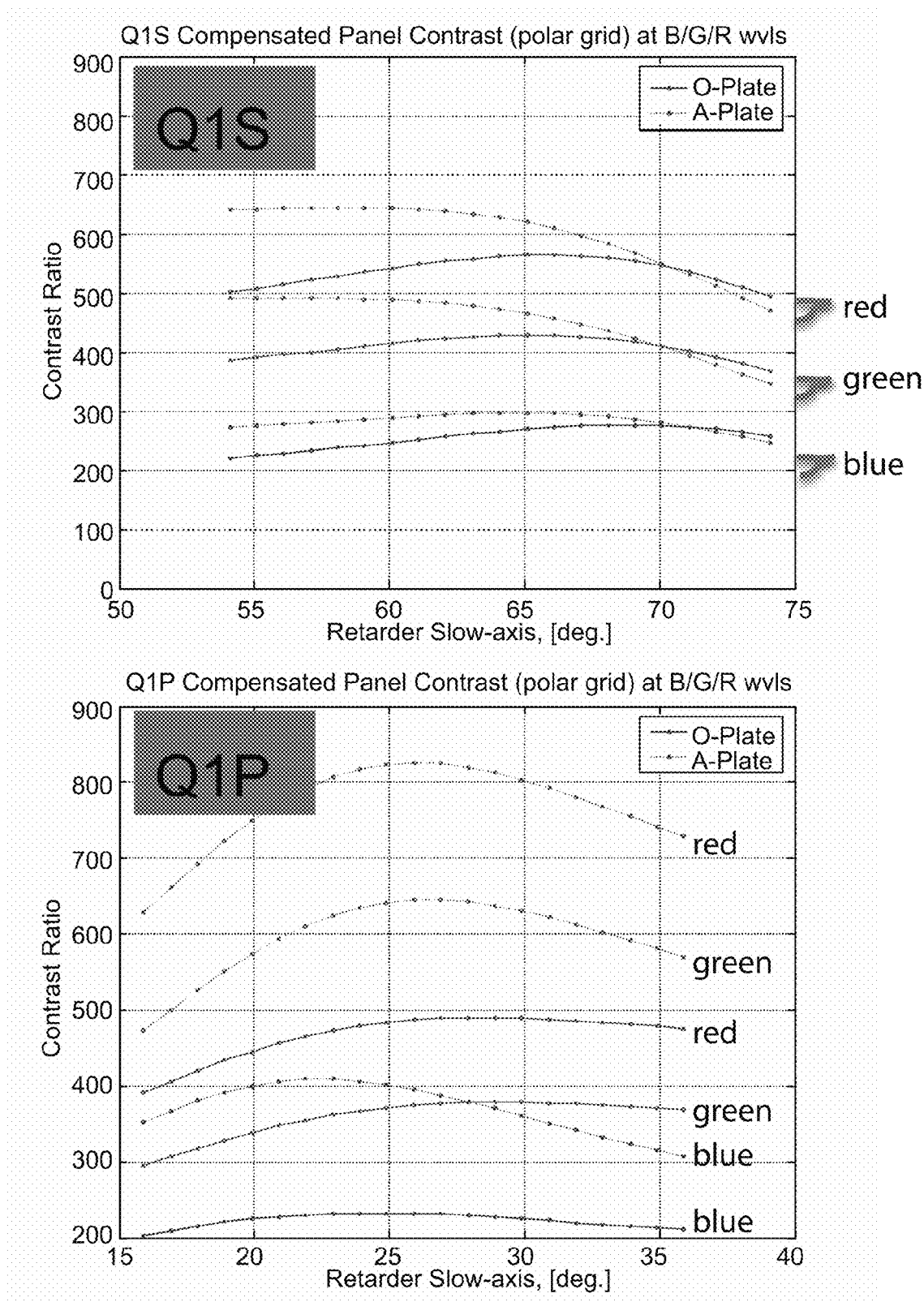

Referring to FIG. 15, the calculated contrast ratios in the blue, green, and red bands and for both single layer A-plate and single layer O-plate configurations are shown for each of the four orientations (i.e., Q1P, Q1S, Q3P, Q3S). More specifically, FIG. 15 illustrates the calculated contrast ratios when the slow axis of the trim retarder is in the $1^{st}$ quadrant close to the P-axis (Q1P), is in the $1^{st}$ quadrant close to the S-axis (Q1S), in the $3^{rd}$ quadrant close to the P-axis (Q3P), and in the $3^{rd}$ quadrant close to the S-axis (Q3S). In each case, the calculated contrast ratios are higher for the A-plate than for the O-plate. In addition, the P-orientations (i.e., Q3P and Q1P) gave slightly better performance. Notably, the A-plate solutions for the two solutions close to the S-axis (i.e., Q1S and Q3S) are equivalent, while the two solutions close to the P-axis (i.e., Q1P and Q3P) are equivalent.

Figure 16:
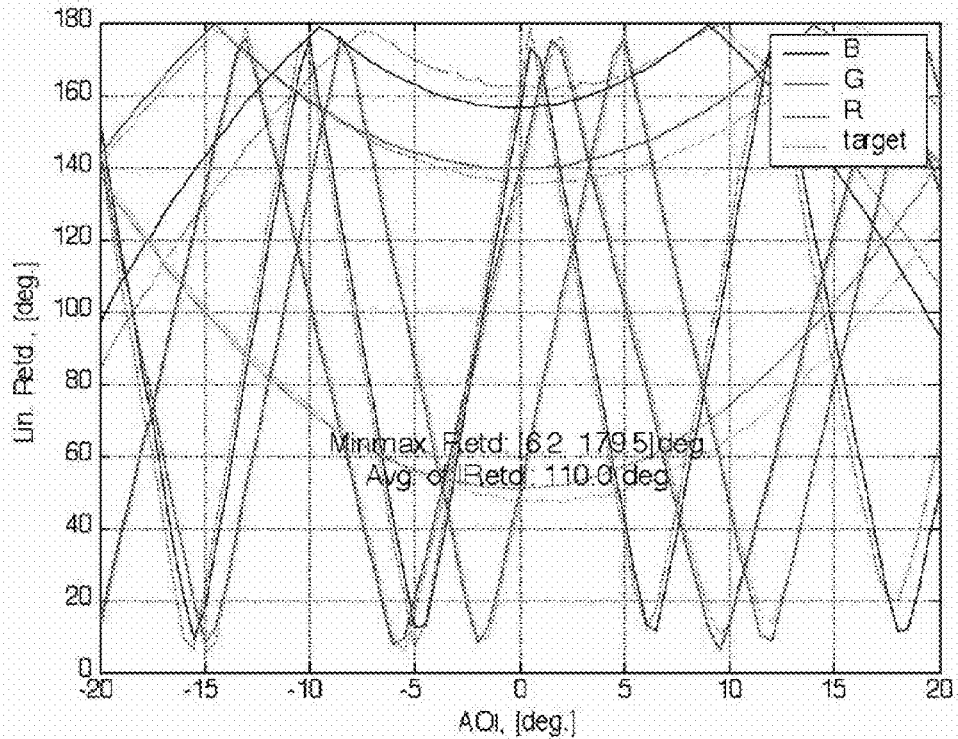
FIG. 16 shows a qualitative comparison of the linear retardance maps calculated for the A-plate on quartz compensator and the TN/sapphire panel using modeled retardance data.
Figure 16:
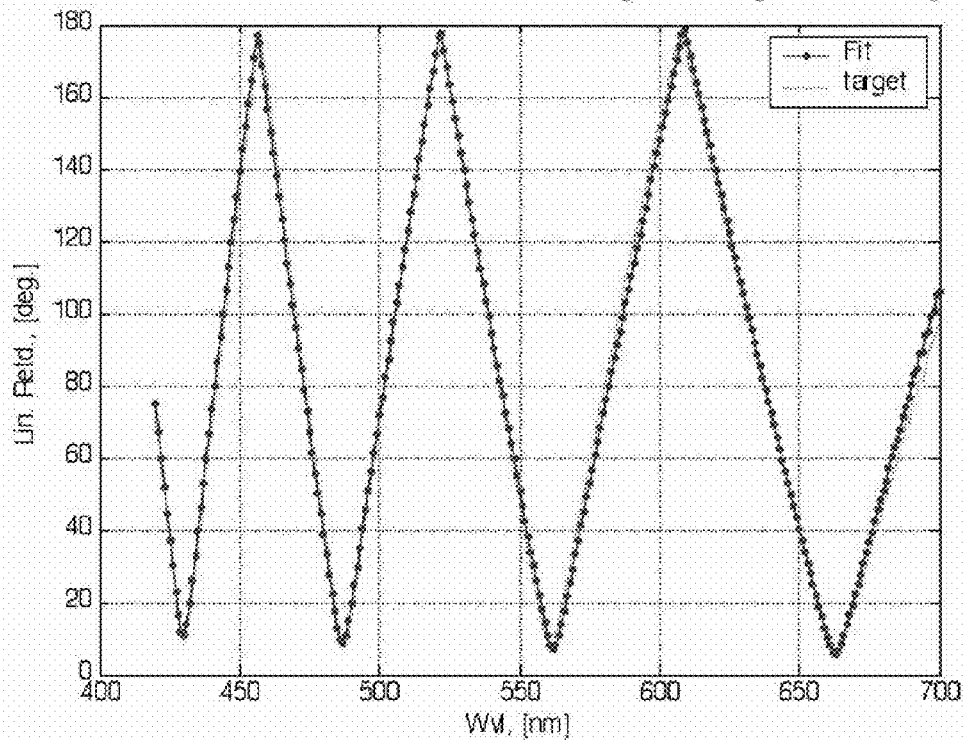

Referring to FIG. 16, it is shown that the spectral retardance dispersion (e.g., left-hand plot) and angular retardance dispersion (e.g., right-hand plot) calculated for the A-plate trim retarder and the quartz plate can be substantially matched to that calculated for the TN-mode cell (i.e., modeled as the TN-layer and the sapphire panel). The angular retardance dispersion plot shows the retardance curve fitting along and orthogonal to the C-axis plane at the red, green, and blue band center wavelengths.

Figure 17:
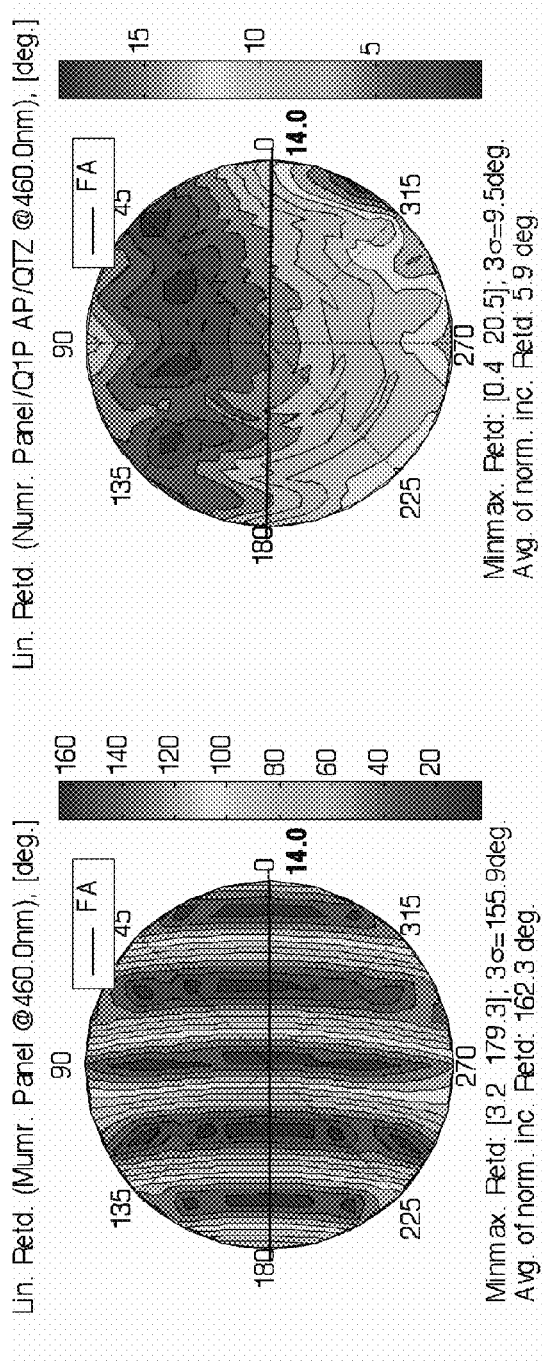
FIG. 17 shows the net retardance and conoscopic leakage calculated for the A-plate on quartz compensator and the TN/sapphire panel in the blue, green, and red bands using modeled retardance data.
Figure 17:
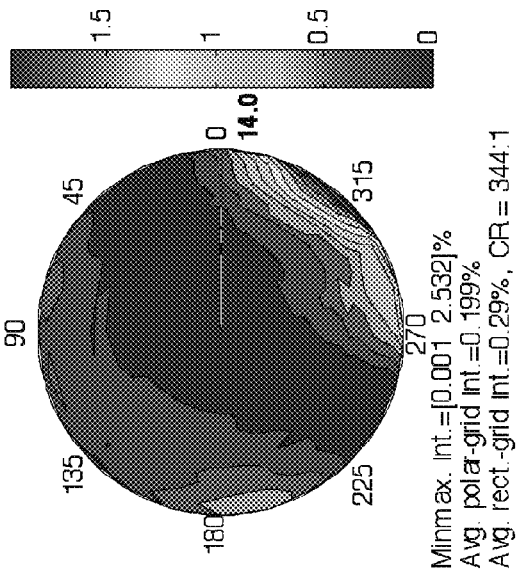
Figure 17:
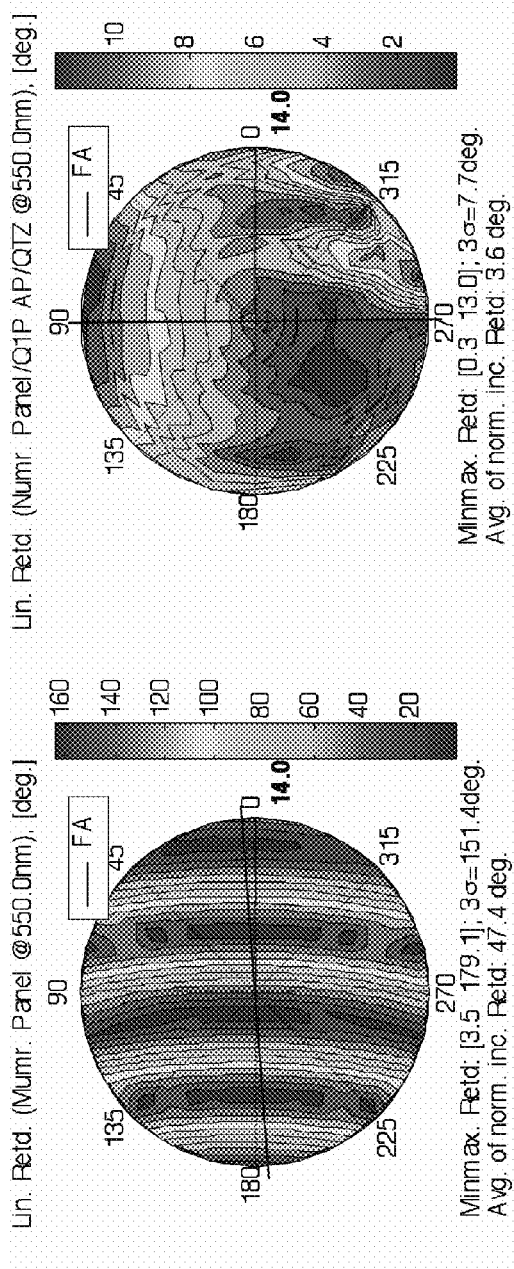
Figure 17:
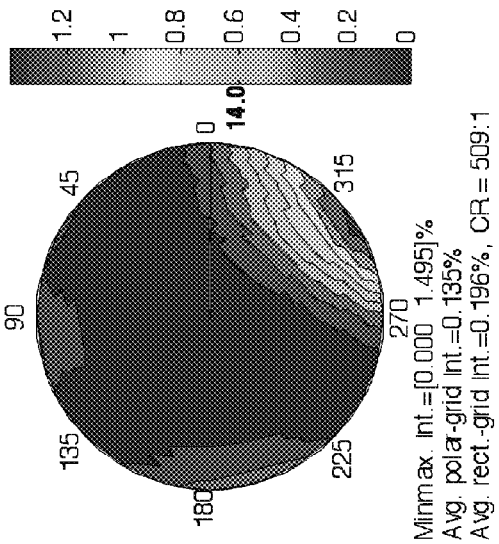
Figure 17:
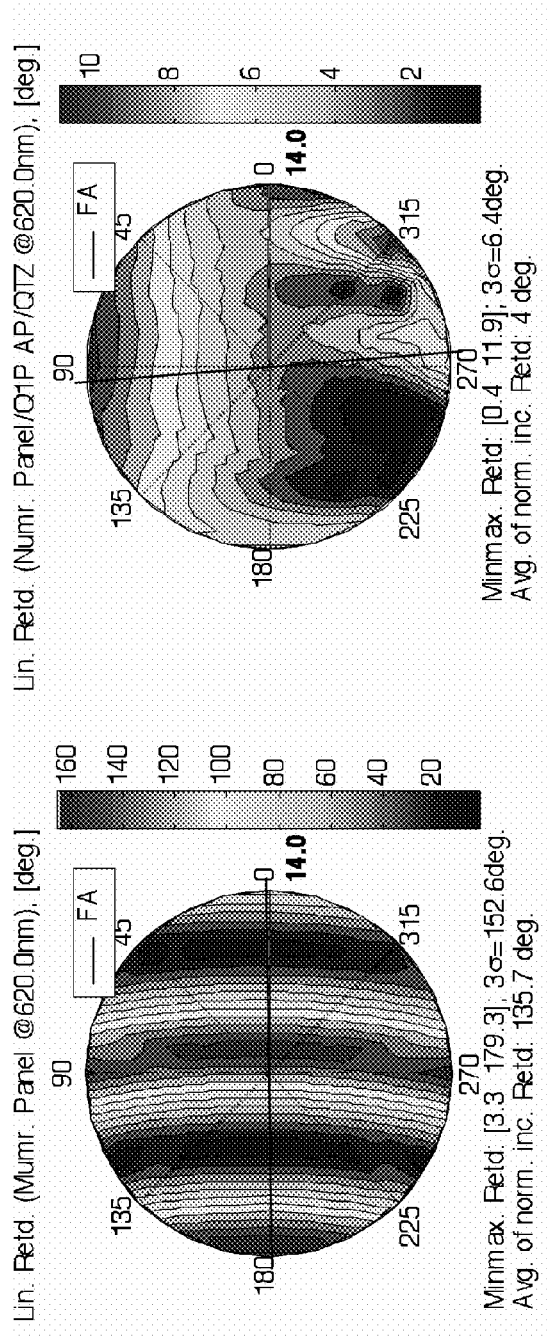
Figure 17:
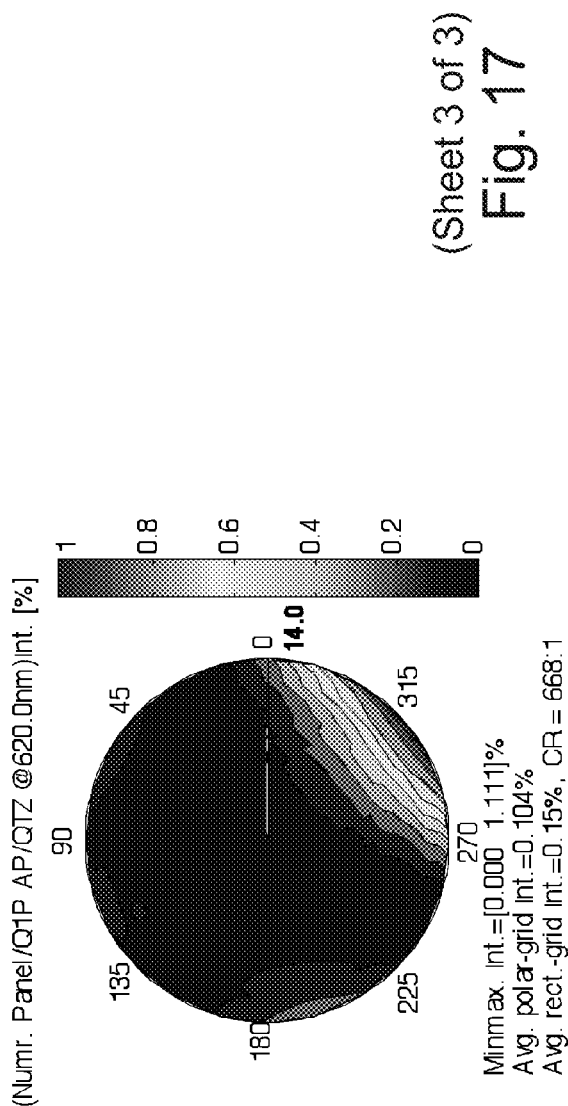

FIG. 17 illustrates the calculated contrast in the blue (e.g., 460 nm), green (e.g., 550 nm), and red (e.g., 620 nm) bands, respectively, when the fitted parameters shown in FIG. 16 are used to model the sapphire panel 14 and TN-mode LC layer 12 compensated with the quartz plate 32 and A-plate 40. Referring to the contour plots on the right-hand side of the figure, the contrast ratios are calculated to be about 340, 510 and 670:1, for the blue, green, and red wavelengths, respectively. While the panel substrate FOV and TN LC layer in-plane retardance appear to be well compensated, there is some light leakage clustered around the $4^{th}$ quadrant. This light leakage is believed to arise from the lack of circular retardance compensation and the lack of TN-LC out-of-plane retardance compensation.

Figure 18:
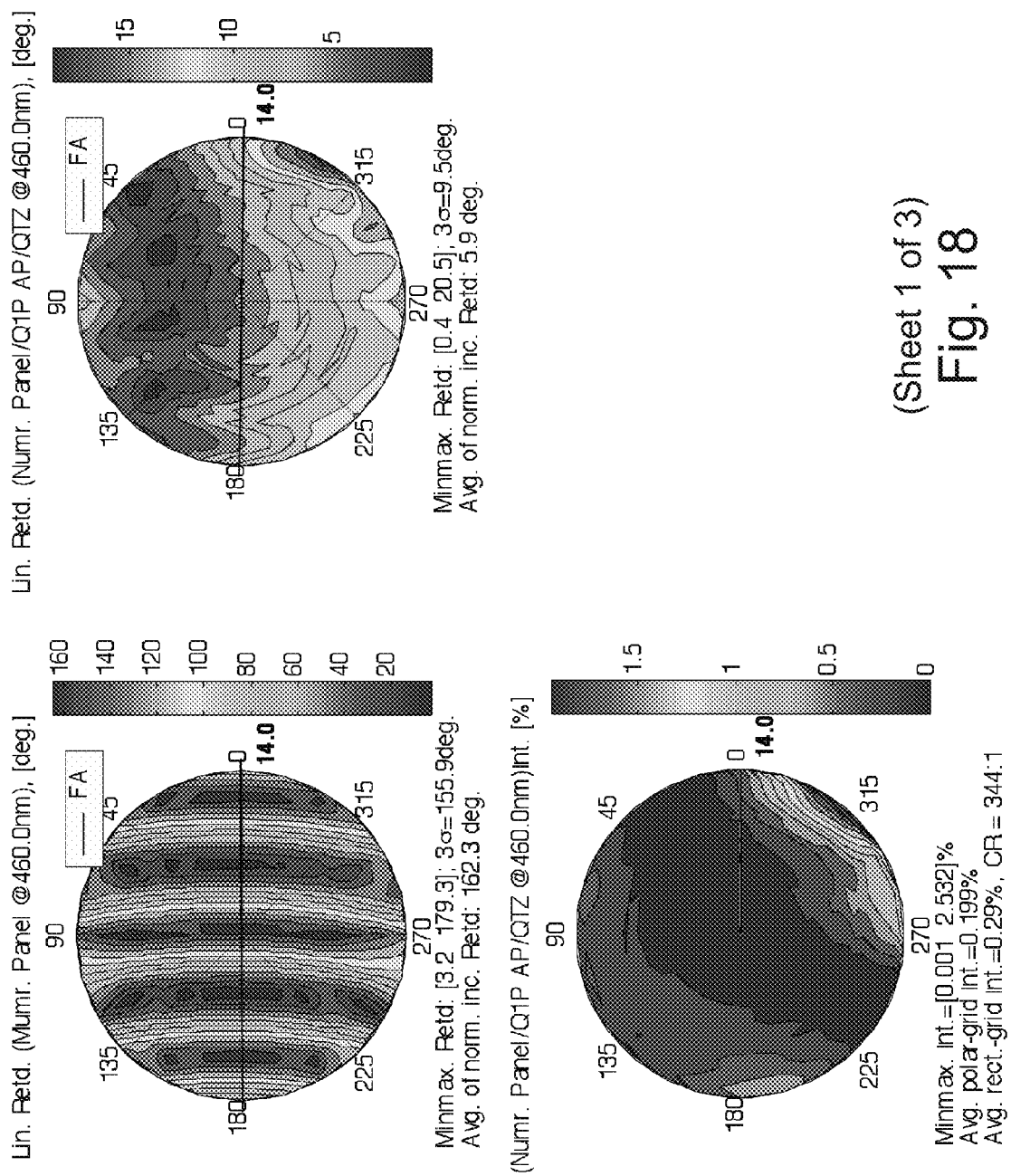
FIG. 18 shows the net retardance and conoscopic leakage calculated for the A-plate on quartz compensator and the TN/sapphire panel in the blue, green, and red bands using experimental retardance data for the TN/sapphire panel.
Figure 18:
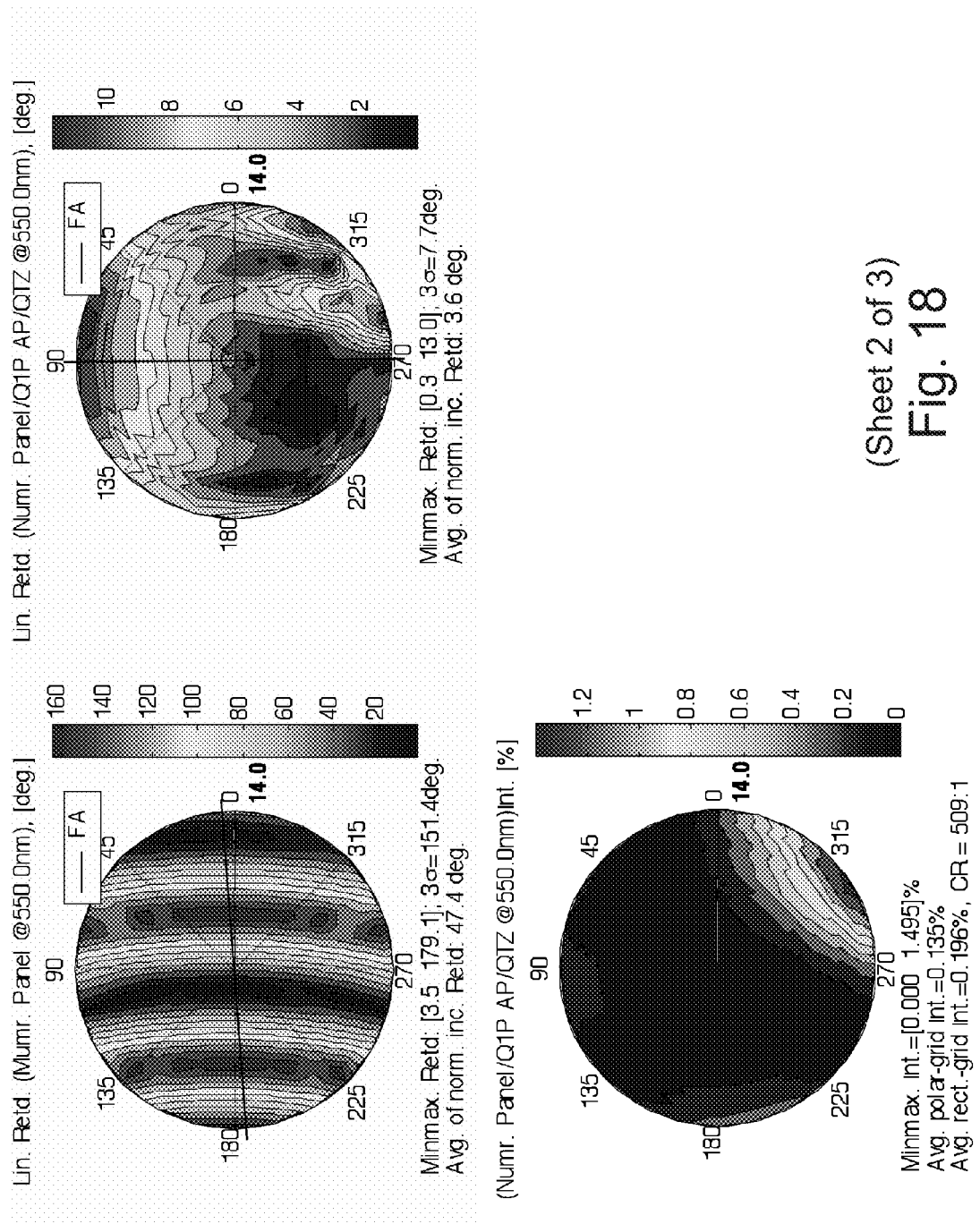
Figure 18:
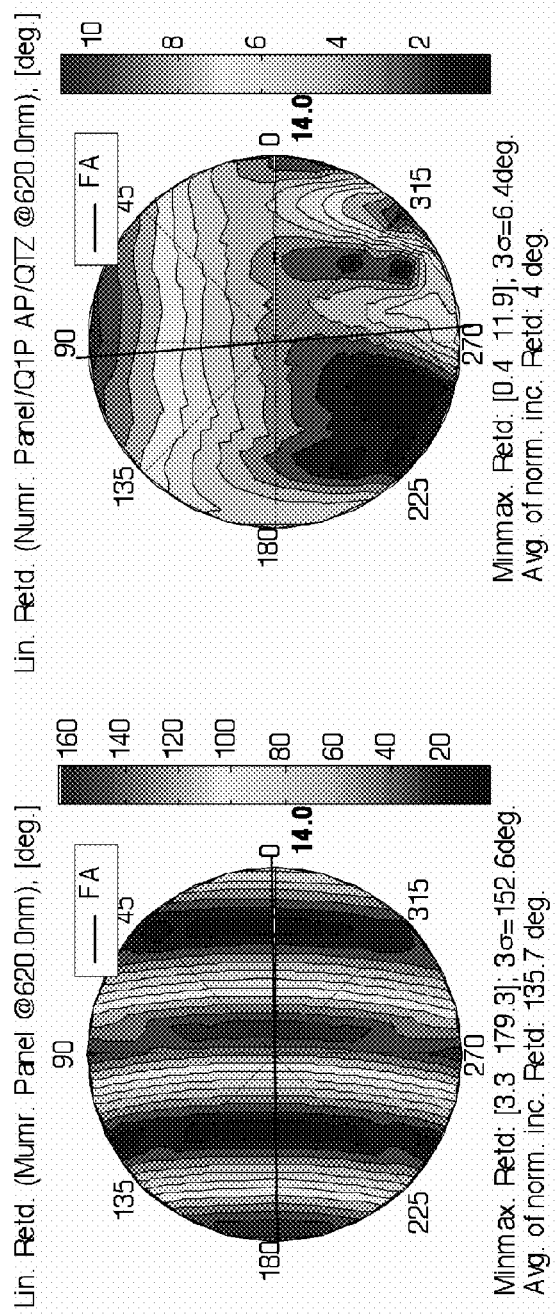
Figure 18:
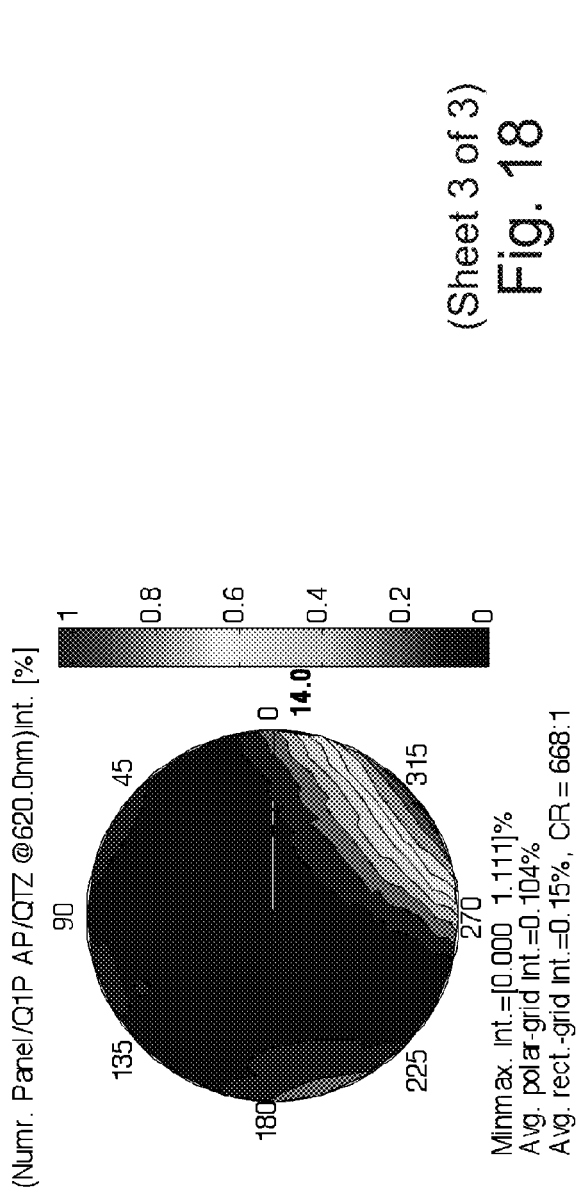

In the above calculations the quartz/A-plate parameters were fitted to match the calculated wavelength and angle retardance spectra. In FIG. 18, the calculated contrast in the blue (e.g., 460 nm), green (e.g., 550 nm), and red (e.g., 620 nm) bands, respectively, is obtained when the quartz/A-plate parameters were fitted to match experimental wavelength and angle spectra. Referring to the right-hand side, the actual panel FOV data gave a calculated 2-state contrast of about 180, 300, and 430:1 in the blue, green, and red bands, respectively. Notably, the largest leakage occurs in the fourth quadrant.

As described above, a high order quartz compensating plate has been shown to significantly improve the contrast ratio of a TN-mode LC microdisplay having a sapphire substrate. For example, in the nominal design described above, tens of thousand to one contrast is achieved for sapphire plate/quartz plate combination. When the birefringent effects of the TN LC layer are included with the birefringent effects of the sapphire plate and when the birefringent effects of a trim retarder are included with the birefringent effects of the quartz compensating plate, the calculated bare panel contrast (e.g., 90:1) was improved to about 500:1 in the green band.

Figure 19A:
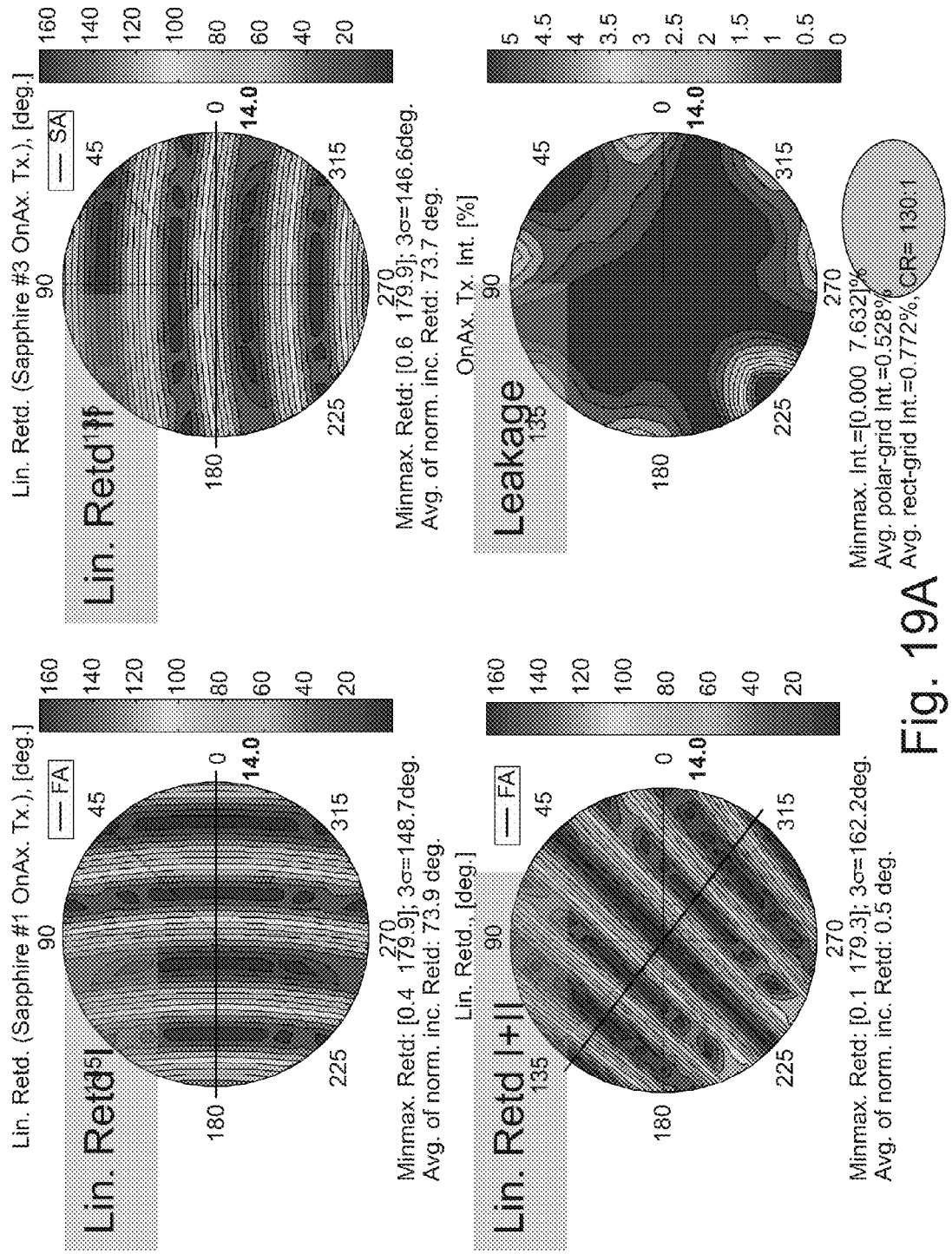
FIGS. 19A and 19B show comparisons of the linear retardance maps and conoscopic leakage maps for two sapphire plates in a cross-axes configuration and for sapphire/quartz plates in a parallel configuration; and, FIG. 20 shows a schematic diagram of a 3-panel transmissive LC microdisplay projection system light engine.
Figure 19B:
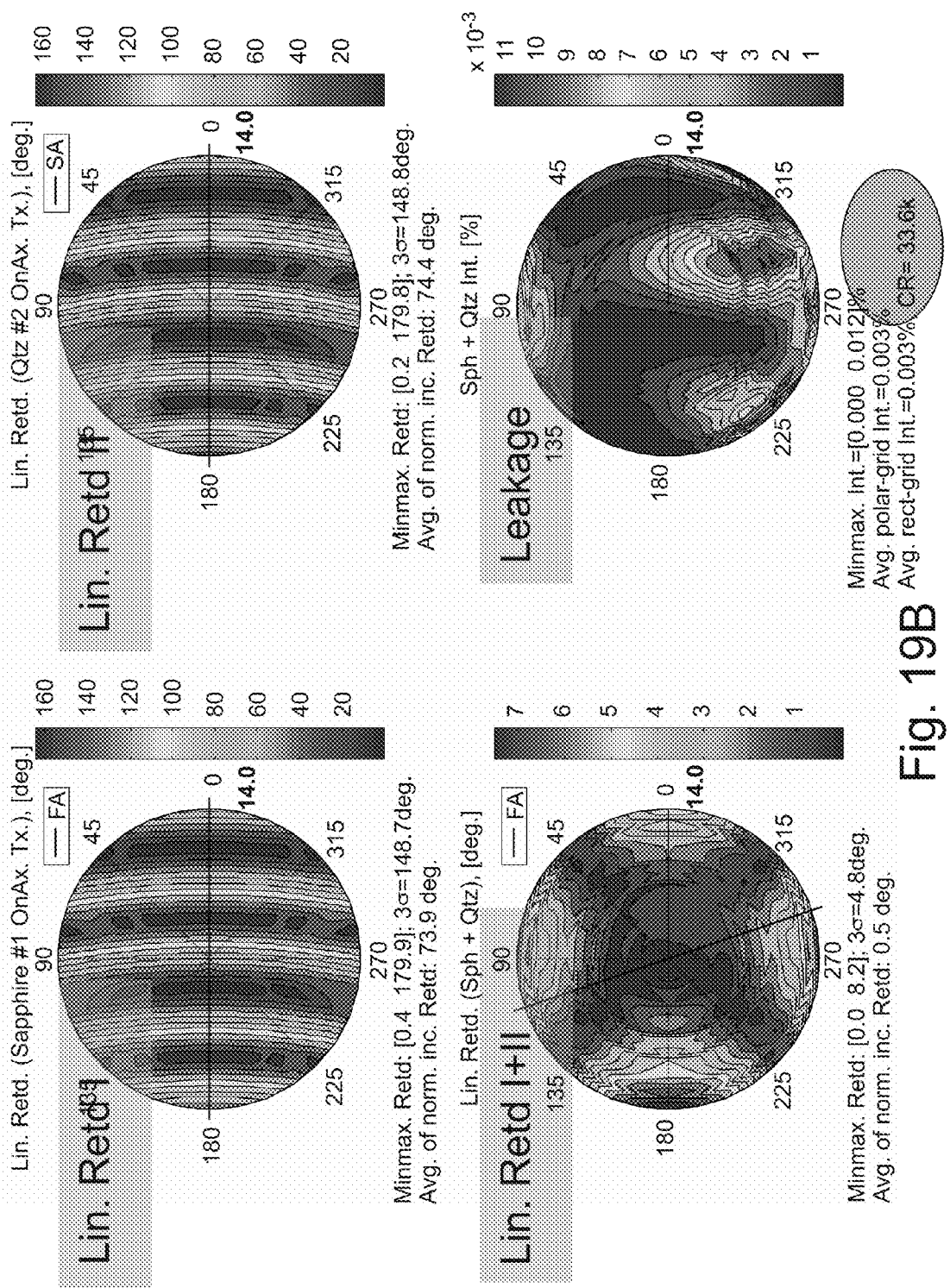

In fact, providing a retarder compensator including a high-order O-plate retarder having a higher but oppositely signed birefringence than the high-order O-plate used as a back plate in a transmissive LC microdisplay has been found to provide improved contrast compensation over other compensation schemes. For example, one approach to improving the contrast ratio of the projection display including sapphire substrate is to provide another sapphire plate having the same thickness and tilt angle, in a crossed-axes configuration. While this arrangement results in a Savart Plate, and thus should exhibit a net retardance of zero, the contrast ratio improvement has been found to not be as efficient as the high order waveplate aligned parallel to the sapphire plate. FIG. 19A shows the contour plots of the cross-axes sapphire/sapphire plates, while FIG. 19B shows contour plots of the parallel-axes sapphire/quart plates. Clearly, the diagonal retardance bands of the cross-axes configuration reduces the off-axis contrast. Notably, the calculated contrast ratio for the cross-axes configuration was only 130:1, whereas the calculated contrast ratio for the parallel-axes configuration was 33,600:1.

While a high-order quartz compensating plate has been shown to significantly improve contrast in a projections system utilizing a normally-white TN-mode LC microdisplay having a sapphire back plate (e.g., including pico-projectors), it is envisioned that the high-order compensating plate may be fabricated with other materials and/or may be used in projection systems based on other LC modes and/or incorporating a high-order retardance semiconductor substrate fabricated from a material other than sapphire. In addition, it is envisioned that the high-order compensating plate will be used with other retarder compensators (e.g., trim retarders) in order to further improve the system contrast.

According to one embodiment of the instant invention, the high-order retardance compensating plate 32 is coupled to the trim retarder 40. For example, in one embodiment the trim retarder includes one or more birefringent or form-birefringent thin-film coatings deposited on the high-order retardance compensating plate, which are configured as A-plates, C-plates, and/or O-plates. When the high-order retardance compensating plate is used to support a trim retarder, the projector system advantageously achieves a high contrast with only one compensator assembly. Accordingly, only one compensator needs to be rotationally clocked, thus simplifying alignment. In addition, only two antireflection coatings are used (i.e., one on each of the external surfaces of the retarder compensator assembly).

In another embodiment of the instant invention, both the high-order retardance compensating plate 32 and the trim retarder 40 are used as stand-alone retarder elements. In this embodiment, the high-order retardance compensating plate 32 is clocked to match the C-axis tilt plane of the high-order semiconductor substrate, while the trim retarder 40 is clocked to optimize compensation for the LC layer dark-state retardance. In this case, four anti-reflection coatings are used.

Figure 20:
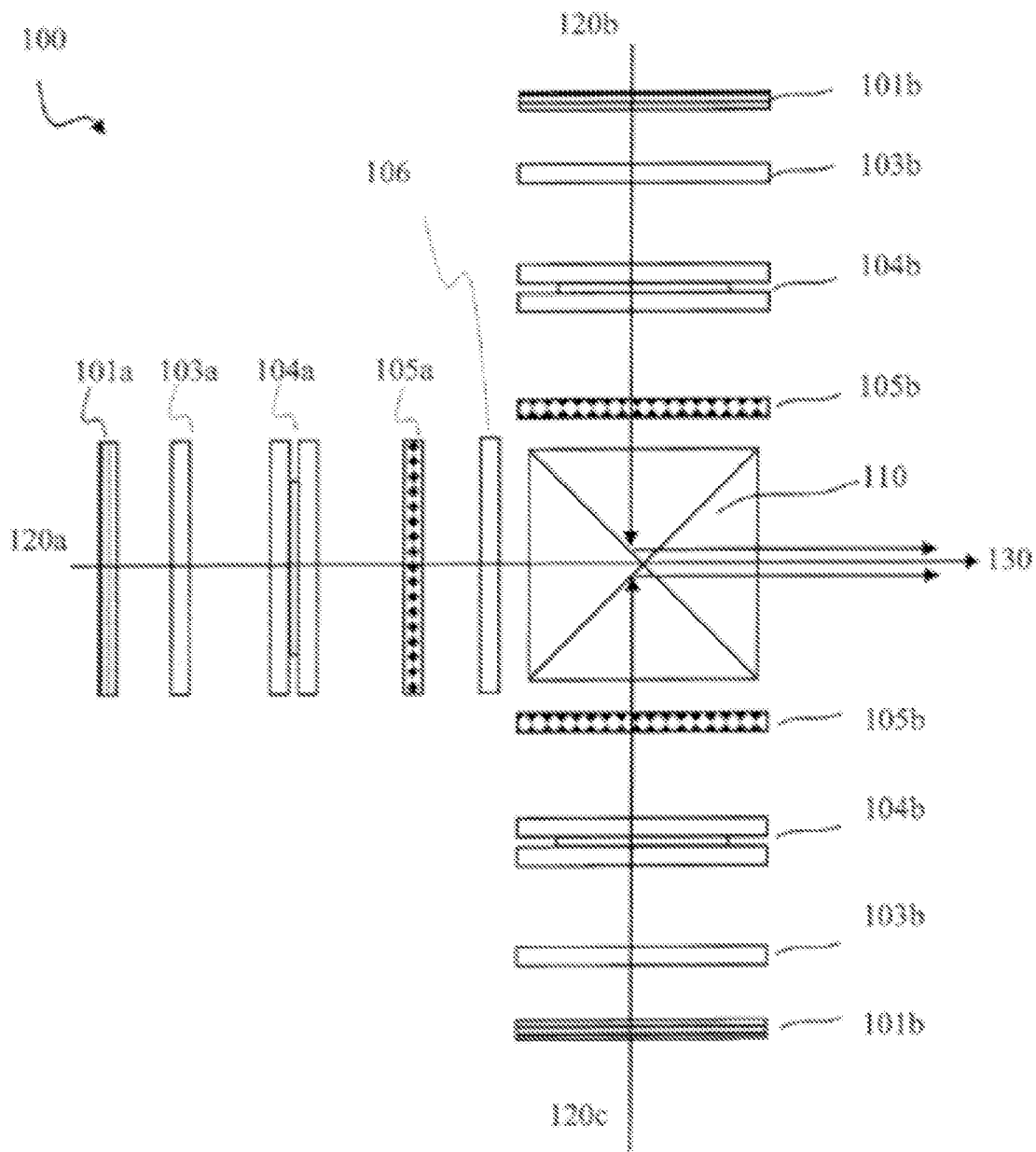

Referring to FIG. 20, there is shown an optical engine for a microdisplay projection system including three transmissive TN-mode LC panels and three retarder compensators. The optical sub-system 100 includes input pre-polarizers 101a, 101b, 101c, retarder compensators 103a, 103b, 103c, TN-mode LC panels 104a, 104b, 104c, and exit clean-up polarizers 105a, 105b, 105c. The center element of the optical sub-system 100 is an X-cube 110, where three separate light beams 120a, 120b, 120c are aggregated and emitted as a converged light beam 130, which is projected onto a screen (not shown). The three separate light beams provide the RGB channel data. In general, the green channel often corresponds to the first light beam 120a so that it is directed at the transmitted port of the X-cube. For each color channel, the LC panel 104a/104b/104c is positioned between a set of crossed polarizers (e.g., between an input pre-polarizer 101a/101b/101c and an exit clean-up polarizer 105a/105b/105c, respectively). In the schematic shown, the input pre-polarizers 101a, 101b, 101c have their transmission axes aligned horizontal (parallel to plane of drawing), while the exit clean-up polarizers 105a, 105b, 105c have their transmission axes aligned vertical. The arm of the optical sub-system 100 corresponding to the green or 'a' channel typically includes a half-waveplate (HWP) 106 to convert the modulated vertically polarized light to horizontally polarized light so that it appears as P-polarized light with respect to the X-cube hypotenuse and is transmitted through the X-cube. Alternatively, if the LC panel 104a rotates the incoming vertical polarization to horizontal polarization in the on-state, the HWP 106 may be positioned in another arm of the optical sub-system 100. Note that each of the retarder compensators 103a, 103b, 103c is shown to be disposed between the pre-polarizers 101a, 101b, 101c and the LC panels 104a/104b/104c, respectively, for exemplary purposes. In other embodiments, the retarder compensators 103a, 103b, 103c are disposed between the LC panels 104a/104b/104c and the analyzers 105a, 105b, 105c, respectively. In each case, each the retarder compensator 103a, 103b, 103c includes a high order O-plate having a thickness and C-axis alignment selected to compensate for the in-plane and out-of-plane retardance of the transparent semiconductor substrate in the LC microdisplay used for TFT fabrication. In-plane retardance, expressed as optical path length difference, refers to the difference between two orthogonal in-plane indices of refraction times the physical thickness of the optical element. Out-of-plane retardance refers to the difference of the index of refraction along the thickness direction (z direction) of the optical element and one in-plane index of refraction (or an average of in-plane indices of refraction), times the physical thickness of the optical element. Normal incidence rays in a cone bundle see only in-plane retardance, whereas off-axis rays including oblique rays (i.e. non-normal but along the principal S- and P-planes) and skew rays (i.e. non-normal and incident away from the principal S- and P-planes) experience both out-of-plane retardance and in-plane retardance. The high-order retardance compensator described above provides efficient compensation of both in-plane and out-of-plane retardance of the high-order retardance transparent semiconductor substrate. In combination with a full-function trim retarder that compensates for the in-plane, out-of-plane, and circular retardance of the LC layer, the contrast ratio is significantly improved. The transparent semiconductor substrate, which in one embodiment is a high-order retardance sapphire crystal plate, will be disposed on the light incident side of the LC panels 104a/104b/104c or the light exiting side of the LC panels 104a/104b/104c.

Of course, the above embodiments have been provided as examples only. It will be appreciated by those of ordinary skill in the art that various modifications, alternate configurations, and/or equivalents will be employed without departing from the spirit and scope of the invention. Accordingly, the scope of the invention is therefore intended to be limited solely by the scope of the appended claims.

The invention claimed is:

1. A liquid crystal microdisplay comprising:
   a liquid crystal microdisplay panel including a first substrate, a second substrate, and a liquid crystal layer disposed between the first and second substrates, the first substrate including a first multiple-order waveplate configured as an O-plate and supporting a thin film transistor layer; and,
   a retarder compensator for compensating for spectral and angular linear retardance dispersions of the first substrate, the retarder compensator including a second multiple-order waveplate configured as an O-plate, the second multiple-order waveplate having a birefringence opposite in sign to a birefringence of the first multiple-order waveplate.

2. A liquid crystal microdisplay according to claim 1, wherein a thickness and C-axis tilt angle of the second multiple-order waveplate are selected such that spectral and angular linear retardance dispersions of the second multiple-order waveplate substantially counteract the spectral and angular dispersions of the first multiple-order waveplate.

3. A liquid crystal microdisplay according to claim 2, wherein the C-axis of the first multiple-order waveplate is oriented in a same tilt plane as a C-axis of the second multiple-order waveplate.

4. A liquid crystal microdisplay according to claim 3, wherein the liquid crystal microdisplay panel is disposed between a polarizer and an analyzer, and wherein the tilt plane is substantially parallel to one of a transmission axis of the polarizer and a transmission axis of the analyzer.

5. A liquid crystal microdisplay according to claim 1, wherein a C-axis of the first multiple-order waveplate is oriented in a same tilt plane as a C-axis of the second multiple-order waveplate.

6. A liquid crystal microdisplay according to claim 3, wherein the first multiple-order waveplate comprises a high-order sapphire waveplate.

7. A liquid crystal microdisplay according to claims 6, wherein the second multiple-order waveplate comprises a high-order quartz waveplate.

8. A liquid crystal microdisplay according to claim 1, wherein the first multiple-order waveplate comprises a high-order sapphire waveplate.

9. A liquid crystal microdisplay according to claim 8, wherein the second multiple-order waveplate comprises a high-order quartz waveplate.

10. A liquid crystal microdisplay according to claim 1, wherein the retarder compensator comprises a trim retarder coupled to the second multiple-order waveplate.

11. A liquid crystal microdisplay according to claim 10, wherein the trim retarder comprises at least one of a thin film birefringent layer and a thin-film form-birefringent layer deposited on the second multiple-order waveplate.

12. A liquid crystal microdisplay according to claim 11, wherein the thin film birefringent layer and the thin-film form-birefringent layer are configured as one of an A-plate, a C-plate, and an O-plate.

13. A liquid crystal microdisplay according to claim 11, wherein the thin film birefringent layer and the thin-film form-birefringent layer are configured as single layer A-plates.

14. A liquid crystal microdisplay according to claim 7, wherein the retarder compensator comprises a trim retarder coupled to the second multiple-order waveplate.

15. A liquid crystal microdisplay according to claim 14, wherein the trim retarder comprises at least one of a thin film birefringent layer and a thin-film form-birefringent layer deposited on the second multiple-order waveplate.

16. A liquid crystal microdisplay according to claim 15, wherein the thin film birefringent layer and the thin-film form-birefringent layer are configured as one of an A-plate, a C-plate, and an O-plate.

17. A liquid crystal microdisplay according to claim 15, wherein the thin film birefringent layer and the thin-film form-birefringent layer are configured as single layer A-plates.

18. A liquid crystal microdisplay according to claim 7, wherein the first multiple-order waveplate is at least 200 microns thick, and the second multiple-order waveplate is at least 200 microns thick.

19. A liquid crystal microdisplay according to claim 1, wherein the first multiple-order waveplate is at least 200 microns thick, and the second multiple-order waveplate is at least 200 microns thick.

* * * * *